US012439230B2

United States Patent
Li et al.

(10) Patent No.: US 12,439,230 B2
(45) Date of Patent: Oct. 7, 2025

(54) METHOD AND APPARATUS FOR UPDATING A VEHICLE-TO-EVERYTHING (VTX) PARAMETER AT A TERMINAL DEVICE

(71) Applicant: Huawei Technologies Co., Ltd., Shenzhen (CN)

(72) Inventors: Meng Li, Beijing (CN); Jiangwei Ying, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 794 days.

(21) Appl. No.: 17/520,135

(22) Filed: Nov. 5, 2021

(65) Prior Publication Data

US 2022/0060868 A1    Feb. 24, 2022

Related U.S. Application Data

(63) Continuation of application No. PCT/CN2020/087665, filed on Apr. 29, 2020.

(30) Foreign Application Priority Data

May 6, 2019  (CN) ........................ 201910372922.8

(51) Int. Cl.
*H04W 4/40*    (2018.01)
*H04W 24/02*    (2009.01)
*H04W 48/12*    (2009.01)

(52) U.S. Cl.
CPC ............. *H04W 4/40* (2018.02); *H04W 24/02* (2013.01)

(58) Field of Classification Search
CPC ..... H04W 24/02; H04W 4/40; H04W 60/005; H04W 60/04; H04W 76/15; H04W 88/06
See application file for complete search history.

(56) References Cited

U.S. PATENT DOCUMENTS

| 10,952,046 B2 * | 3/2021 | Lee ........................ H04W 4/12 |
| 11,076,318 B2 * | 7/2021 | Shan ................... H04L 65/1104 |

(Continued)

FOREIGN PATENT DOCUMENTS

| CN | 105992122 A | 10/2016 |
| CN | 107295470 A | 10/2017 |

(Continued)

OTHER PUBLICATIONS

"3rd Generation Partnership Project; Technical Specification Group Services and System Aspects; Study on enhancement of 3GPP Support for 5G V2X Services (Release 15)," 3GPP TR 22.886 V1.0.0, total 46 pages, 3rd Generation Partnership Project, Valbonne, France (Sep. 2016).

(Continued)

*Primary Examiner* — Jenee Holland
(74) *Attorney, Agent, or Firm* — Leydig, Voit & Mayer, Ltd.

(57) ABSTRACT

A communication method, a communications apparatus, and a system are provided, applied to the vehicle-to-everything V2X field, so that a terminal device can obtain an updated V2X parameter, to resolve a problem that communication fails because the terminal device uses an expired V2X parameter. The communication method includes: receiving, by a V2X control network element, parameter update indication information sent by a user data management network element, where the parameter update indication information indicates that a V2X parameter of a terminal device is updated; and sending, by the V2X control network element, an updated V2X parameter to the terminal device based on the parameter update indication information.

20 Claims, 12 Drawing Sheets

(56) References Cited

U.S. PATENT DOCUMENTS

| | | | |
|---|---|---|---|
| 11,432,135 B2* | 8/2022 | Shan | H04L 12/1403 |
| 11,751,172 B2* | 9/2023 | Lei | H04W 72/02 370/329 |
| 11,838,839 B2* | 12/2023 | Shan | H04W 4/50 |
| 11,917,451 B2* | 2/2024 | Kim | H04W 28/0284 |
| 12,004,111 B2* | 6/2024 | Shan | H04W 4/40 |
| 2018/0160398 A1 | 6/2018 | Park et al. | |
| 2018/0199398 A1 | 7/2018 | Dao et al. | |
| 2019/0090107 A1 | 3/2019 | Kim et al. | |
| 2019/0140933 A1* | 5/2019 | Guim Bernat | H04L 43/08 |
| 2019/0230645 A1* | 7/2019 | Cheng | H04W 12/08 |
| 2019/0286843 A1* | 9/2019 | Fukuhara | G06F 21/6245 |
| 2019/0313359 A1* | 10/2019 | Lee | H04W 76/14 |
| 2020/0112841 A1* | 4/2020 | Kim | H04W 4/70 |
| 2020/0178048 A1* | 6/2020 | Kim | H04W 12/062 |
| 2020/0344637 A1* | 10/2020 | Kim | H04W 4/06 |
| 2020/0374828 A1* | 11/2020 | Ying | H04W 4/50 |
| 2021/0168584 A1* | 6/2021 | Li | H04W 48/18 |
| 2021/0352465 A1* | 11/2021 | Lee | H04W 4/40 |
| 2021/0400448 A1* | 12/2021 | Adjakple | H04W 4/40 |
| 2022/0053449 A1* | 2/2022 | Shan | H04W 36/0066 |
| 2022/0103987 A1* | 3/2022 | Shan | H04W 4/40 |
| 2022/0159527 A1* | 5/2022 | Lee | H04W 8/24 |

FOREIGN PATENT DOCUMENTS

| | | |
|---|---|---|
| CN | 107710795 A | 2/2018 |
| CN | 108111606 A | 6/2018 |
| CN | 108200552 A | 6/2018 |
| CN | 109217990 A | 1/2019 |
| CN | 109429373 A | 3/2019 |
| WO | 2018005531 A1 | 1/2018 |
| WO | 2018117774 A1 | 6/2018 |
| WO | 2018206992 A1 | 11/2018 |
| WO | 2018211488 A1 | 11/2018 |
| WO | 2018233674 A1 | 12/2018 |

OTHER PUBLICATIONS

Huawei, HiSilicon, Convida Wireless LLC, "KI#5 and KI#11: Update of Solution 5," SA WG2 Meeting #129, Dongguan, People's Republic of China, S2-1810634, total 6 pages, 3rd Generation Partnership Project, Valbonne, France (Oct. 15-19, 2018).

"3rd Generation Partnership Project; Technical Specification Group Services and System Aspects; General Packet Radio Service (GPRS) enhancements for Evolved Universal Terrestrial Radio Access Network (E-UTRAN) access (Release 16)," 3GPP TS 23.401 V16.2.0, total 418 pages, 3rd Generation Partnership Project, Valbonne, France (Mar. 2019).

Samsung, "Functional entities update," SA WG2 Meeting #132, Xi'an, China, S2-1903250, total 2 pages, 3rd Generation Partnership Project, Valbonne, France (Apr. 8-12, 2019).

"3rd Generation Partnership Project; Technical Specification Group Services and System Aspects; Architecture enhancements for V2X services (Release 16)," 3GPP TS 23.285 V16.0.0, total 37 pages, 3rd Generation Partnership Project, Valbonne, France (Mar. 2019).

Ericsson, Catt, "Solutions for KI#5, KI#6 and KI#11 Service Authorisation," 3GPP SA WG2 Meeting #127, Sanya, PR China, S2-183875, total 5 pages, 3rd Generation Partnership Project, Valbonne, France (Apr. 16-20, 2018).

"3rd Generation Partnership Project; Technical Specification Group Services and System Aspects; Study on architecture enhancements for the Evolved Packet System (EPS) and the 5G System (5GS) to support advanced V2X services (Release 16)," 3GPP TR 23.786 V16.0.0, total 118 pages, 3rd Generation Partnership Project, Valbonne, France (Mar. 2019).

Vivo, "Update on Functional Entities description," SA WG2 Meeting #132, Xi'an, China, S2-1903481, total 3 pages, 3rd Generation Partnership Project, Valbonne, France (Apr. 8-12, 2019).

"3rd Generation Partnership Project; Technical Specification Group Core Network and Terminals; User Equipment (UE) to V2X control function; protocol aspects; Stage 3 (Release 15)," 3GPP TS 24.386 V15.2.0, total 35 pages, 3rd Generation Partnership Project, Valbonne, France (Dec. 2018).

"3rd Generation Partnership Project; Technical Specification Group Services and System Aspects; Procedures for the 5G System; Stage 2 (Release 16)," 3GPP TS 23.502 V16.0.2, total 419 pages, 3rd Generation Partnership Project, Valbonne, France (Apr. 2019).

"3rd Generation Partnership Project; Technical Specification Group Services and System Aspects; Policy and Charging Control Framework for the 5G System; Stage 2 (Release 16)," 3GPP TS 23.503 V16.0.0, total 84 pages, 3rd Generation Partnership Project, Valbonne, France (Mar. 2019).

"3rd Generation Partnership Project; Technical Specification Group Core Network and Terminals; Non-Access Stratum (NAS) configuration Management Object (MO) (Release 16)," 3GPP TS 24.368 V16.0.0, total 29 pages, 3rd Generation Partnership Project, Valbonne, France (Mar. 2019).

Wu Hai et al., "C-V2X technical framework and key technology research," China Mobile Group Design Institute Co., Ltd., total 6 pages (Jun. 2018). With English abstract.

* cited by examiner

METHOD AND APPARATUS FOR UPDATING A VEHICLE-TO-EVERYTHING (VTX) PARAMETER AT A TERMINAL DEVICE

CROSS-REFERENCE TO RELATED APPLICATIONS

This application is a continuation of International Application No. PCT/CN2020/087665, filed on Apr. 29, 2020, which claims priority to Chinese Patent Application No. 201910372922.8, filed on May 6, 2019. The disclosures of the aforementioned applications are hereby incorporated by reference in their entireties.

TECHNICAL FIELD

This application relates to the field of wireless communications technologies, and in particular, to a communication method, and a communications apparatus and system.

BACKGROUND

Currently, vehicle-to-everything (V2X) provides two communications technologies: device-to-device (D2D) direct communication and base station scheduling communication. The D2D direct communications technology allows direct communication to be performed between user equipments (UEs) through a PC5 interface. Therefore, a transmission latency is relatively low and a relatively small quantity of resources are configured. The base station forwarding communications technology is used for communication through a Uu interface. Therefore, reliability is relatively high.

There are two V2X scenarios: One V2X scenario is a scenario with coverage of a cellular network. The cellular network includes but is not limited to a 5th generation (5G) communications system and a 4th generation (4G) communications system. In this case, a service may be provided through a Uu interface in the cellular network to implement high-bandwidth and large-coverage communication, and a service may also be provided through a PC5 interface to implement low-latency and high-reliability direct communication between a vehicle and a peripheral node. The other V2X scenario is a scenario that is independent of a cellular network. In an area in which no network is deployed, an internet of vehicles road service is provided through a PC5 interface to meet a driving safety requirement. In the scenario with the coverage of the cellular network, during data transmission, flexible and seamless handover can be performed between the Uu interface and the PC5 interface.

In a 5G communications system, a policy control function (PCF) network element provides a V2X parameter for user equipment (UE), where the V2X parameter may be used for communication through a PC5 interface. The V2X parameter sent by the PCF may include a parameter used in the 5G communications system and a parameter used in a 4G communications system.

In a 4G communications system, UE sends a request to a V2X control function (V2XCF) network element, and the V2XCF network element provides a V2X parameter for the UE. For example, the UE actively initiates establishment of an association relationship between the UE and the V2XCF, and then the V2XCF sends the V2X parameter to the UE.

In a V2X scenario, if UE has obtained, in a 5G communications system, a V2X parameter used in a 4G communications system, when the UE moves to the 4G communications system, the UE does not trigger a procedure of obtaining the V2X parameter again. When the UE attempts to communicate with a radio access network (RAN) in the 4G communications system, the UE still uses the V2X parameter that is used in the 4G communications system and that is obtained in the 5G communications system. Therefore, the UE fails to perform communication.

SUMMARY

Embodiments of this application provide a communication method, and a communications apparatus and system, so that a terminal device obtains an updated V2X parameter, to resolve a problem that communication fails because the terminal device uses an expired V2X parameter.

To resolve the foregoing technique problem, the embodiments of this application provide the following technical solutions.

According to a first aspect, an embodiment of this application provides a communication method, including: a vehicle-to-everything V2X control network element receives parameter update indication information sent by a user data management network element, where the parameter update indication information is used to indicate that a V2X parameter of a terminal device is updated. The V2X control network element sends an updated V2X parameter to the terminal device based on the parameter update indication information. In this embodiment of this application, the V2X control network element may receive the parameter update indication information from the user data management network element, and the V2X control network element may send the updated V2X parameter to the terminal device based on the received indication information. Therefore, the terminal device may obtain the updated V2X parameter from the V2X control network element, and the terminal device may perform communication by using the updated V2X parameter, to resolve a problem that communication fails because the terminal device uses an expired V2X parameter.

In a possible implementation, the method further includes: the V2X control network element obtains the updated V2X parameter from the user data management network element. The user data management network element may update the V2X parameter, and store the updated V2X parameter. The user data management network element may interact with the V2X control network element, to provide the updated V2X parameter for the V2X control network element. The user data management network element may send the updated V2X parameter and the parameter update notification information in a same message, or may send the updated V2X parameter before or after sending the parameter update notification information. This is not limited herein.

In a possible implementation, the parameter update indication information is further used to indicate that the terminal device is reachable in a first network, and the V2X control network element is a network element in the first network. Specifically, the user data management network element sends the parameter update notification information to the V2X control network element, where the parameter update notification information is used to notify the V2X control network element that the terminal device is reachable in the first network, and the V2X control network element may determine that the terminal device is reachable in the first network.

In a possible implementation, that the terminal device is reachable in a first network includes: the terminal device registers with the first network. For example, that the terminal device is reachable in a first network may specifically include: the terminal device registers with the first network. When the terminal device is reachable in the first network, the user data management network element sends the parameter update notification information to the V2X control network element. That the terminal device is reachable in a first network includes: the terminal device registers with the first network. Without limitation, the parameter update notification information may explicitly indicate that the terminal device is handed over from a second network to the first network, or may only indicate that the terminal device accesses the first network. The V2X control network element determines a handover operation of the terminal device based on the received parameter update notification information.

In a possible implementation, the V2X parameter includes at least one of the following: a public land mobile network PLMN list used for communication through a PC5 interface; indication information indicating whether to perform communication through the PC5 interface; a radio resource configuration parameter used for communication through the PC5 interface; network selection policy information used for communication through the PC5 interface; and a mapping relationship between a V2X service and identification information of the terminal device. The V2X parameter may be subscription information notified by an HSS to a V2XCF. The public land mobile network PLMN list used for communication through the PC5 interface may be a PLMN list in which UE covered by E-UTRA or NR can perform communication through the PC5 interface. The indication information indicating whether to perform communication through the PC5 interface is information indicating whether UE that is not covered by E-UTRA or NR can perform communication through LTE PC5/NR PC5. For example, the indication information may occupy 1 bit, and a value 0 or 1 indicates whether to perform communication through PC5. The radio resource configuration parameter used for communication through the PC5 interface is a specific radio resource parameter used when UE that is "not covered by E-UTRA or NR" can perform communication through LTE PC5 or NR PC5. For example, the radio resource configuration parameter may include corresponding geographical location information, for example, a list including the geographical location information. The network selection policy information used for communication through the PC5 interface is selection policy information used to select LTE PC5 or NR PC5 for communication, and specifically includes mapping information between a "V2X service" and a "corresponding PC5 interface". For communication through the NR PC5 interface, the V2X parameter may further include a mapping relationship that is between a "V2X service" and "corresponding identification information" and that is used to establish a PC5 unicast connection and perform PC5 multicast and broadcast communication. Specifically, the content included in the V2X parameter may be determined based on an application scenario. This is merely used as an example for description, and is not intended to limit this embodiment of this application.

According to a second aspect, an embodiment of this application further provides a communication method, including: a user data management network element determines that a vehicle-to-everything V2X parameter of a terminal device is updated. The user data management network element sends parameter update indication information to a V2X control network element, where the parameter update indication information is used to indicate that the V2X parameter of the terminal device is updated. In this embodiment of this application, the V2X control network element receives the parameter update indication information sent by the user data management network element, where the parameter update indication information is used to indicate that the V2X parameter of the terminal device is updated. The V2X control network element sends an updated V2X parameter to the terminal device based on the parameter update indication information. In this embodiment of this application, the V2X control network element may receive the parameter update indication information from the user data management network element, and the V2X control network element may send the updated V2X parameter to the terminal device based on the received indication information. Therefore, the terminal device may obtain the updated V2X parameter from the V2X control network element, and the terminal device may perform communication by using the updated V2X parameter, to resolve a problem that communication fails because the terminal device uses an expired V2X parameter.

In a possible implementation, that a user data management network element determines that a vehicle-to-everything V2X parameter of a terminal device is updated includes: the user data management network element receives parameter delivery request information sent by a policy control function PCF network element, where the parameter delivery request information is used to request the V2X parameter of the terminal device from the user data management network element. The user data management network element determines a first moment based on the parameter delivery request information. The user data management network element updates the V2X parameter of the terminal device, and obtains a second moment at which the V2X parameter is updated. The user data management network element determines, based on the first moment and the second moment, that the V2X parameter of the terminal device is updated. The user data management network element may determine the first moment based on the parameter delivery request information sent by the PCF network element, where the first moment may be a moment determined based on the parameter delivery request information. The user data management network element may further use a moment at which the V2X parameter is updated as the second moment. The user data management network element compares the obtained first moment and the obtained second moment, and determines, based on the first moment and the second moment, that the V2X parameter needs to be updated. For example, when the first moment and the second moment meet a preset condition, the user data management network element determines that the V2X parameter needs to be updated. For example, when the first moment is different from the second moment, the user data management network element determines that the V2X parameter needs to be updated.

In a possible implementation, the first moment is a request moment carried in the parameter delivery request information, or the first moment is a moment at which the parameter delivery request information is received. For example, the first moment may be a moment at which the V2X parameter is requested and that is carried in the parameter delivery request information, or may be a moment recorded according to an indication of the parameter delivery request information.

In a possible implementation, that a user data management network element determines that a vehicle-to-everything V2X parameter of a terminal device is updated includes at least one of the following cases: when determining that the terminal device is in an unreachable state, the user data management network element determines that the V2X parameter is updated; when determining that the terminal device is in a deregistered state, the user data management network element determines that the V2X parameter is updated; and when determining that the V2X parameter stored by the user data management network element changes, the user data management network element determines that the V2X parameter is updated. When the terminal device is in the unreachable state, the user data management network element determines that the V2X parameter of the terminal device needs to be updated. For another example, when the terminal device is in the deregistered state, the user data management network element determines that the V2X parameter of the terminal device needs to be updated. For another example, when the V2X parameter stored by the user data management network element changes, for example, subscription data of a user changes. For example, previous subscription information of the user includes a value-added service, includes a plurality of public land mobile networks, and may support a relatively high maximum transmission rate on a PC5 interface. However, the user cancels the value-added service due to some reasons, and consequently the maximum transmission rate on the PC5 interface decreases. For another example, previous subscription information of a user supports communication through PC5 in a plurality of public land mobile networks. However, because the subscription information changes, supported operators change, or the V2X parameter has expired. Based on the foregoing examples, the user data management network element may accurately learn that the V2X parameter is updated.

In a possible implementation, the method further includes: the user data management network element sends the updated V2X parameter to the V2X control network element. The user data management network element may update the V2X parameter, and store the updated V2X parameter. The user data management network element may interact with the V2X control network element, to provide the updated V2X parameter for the V2X control network element. The user data management network element may send the updated V2X parameter and the parameter update notification information in step 412 in a same message, or may send the updated V2X parameter before or after sending the parameter update notification information. This is not limited herein.

According to a third aspect, an embodiment of this application provides a communication method, including: a policy control function PCF network element sends parameter delivery request information to a user data management network element, where the parameter delivery request information is used to request a V2X parameter of a terminal device from the user data management network element. The PCF network element receives the V2X parameter sent by the user data management network element. In this embodiment of this application, when the PCF network element needs to provide the V2X parameter for the terminal device, the PCF network element triggers a procedure of obtaining the V2X parameter from the user data management network element. Specifically, the PCF network element requests the V2X parameter from the user data management network element, and the user data management network element sends a response message to the PCF network element, where the response message includes the V2X parameter. The user data management network element may determine, based on the parameter delivery request information sent by the PCF network element, that the PCF network element has sent the V2X parameter to the terminal device.

In a possible implementation, the parameter delivery request information carries information about a moment at which the PCF network element requests the V2X parameter; or the parameter delivery request information is used to indicate the user data management network element to record a moment at which the parameter delivery request information is received. Specifically, the user data management network element may determine a first moment based on the parameter delivery request information sent by the PCF network element, where the first moment may be the moment at which the V2X parameter is requested and that is carried in the parameter delivery request information, or may be the moment at which the parameter delivery request information is received and that is recorded according to the indication of the parameter delivery request information. The user data management network element may determine, based on the first moment determined from the parameter delivery request information and a second moment at which the user data management network element updates the V2X parameter, whether the V2X parameter is updated.

According to a fourth aspect, an embodiment of this application provides a communication method, including: a user data management network element determines that a vehicle-to-everything V2X parameter of a terminal device is updated. The user data management network element sends parameter update indication information to a V2X control network element, where the parameter update indication information is used to indicate that the V2X parameter of the terminal device is updated. The V2X control network element sends an updated V2X parameter to the terminal device based on the parameter update indication information.

In a possible implementation, the method further includes: the V2X control network element obtains the updated V2X parameter from the user data management network element.

In a possible implementation, that a user data management network element determines that a vehicle-to-everything V2X parameter of a terminal device is updated includes: the user data management network element receives parameter delivery request information sent by a policy control function PCF network element, where the parameter delivery request information is used to request the V2X parameter of the terminal device from the user data management network element. The user data management network element determines a first moment based on the parameter delivery request information. The user data management network element updates the V2X parameter of the terminal device, and obtains a second moment at which the V2X parameter is updated. The user data management network element determines, based on the first moment and the second moment, that the V2X parameter is updated.

In a possible implementation, the method further includes: the policy control function PCF network element sends the parameter delivery request information to the user data management network element, where the parameter delivery request information is used to request the V2X parameter of the terminal device from the user data management network element. The user data management network element receives the parameter delivery request information, and sends the V2X parameter of the terminal device to the PCF network element based on the parameter delivery request information. The PCF network element receives the V2X parameter that is of the terminal device and that is sent by the user data management network element.

According to a fifth aspect, an embodiment of this application provides a communications apparatus. The communications apparatus is a vehicle-to-everything V2X control network element and includes at least one processor, and the at least one processor is configured to: be coupled to a memory, and read and execute instructions in the memory, to implement the method according to any one of the possible implementations of the first aspect.

In a possible implementation, the communications apparatus further includes the memory.

According to a sixth aspect, an embodiment of this application provides a communications apparatus. The communications apparatus is a user data management network element and includes at least one processor, and the at least one processor is configured to: be coupled to a memory, and read and execute instructions in the memory, to implement the method according to any one of the possible implementations of the second aspect.

In a possible implementation, the communications apparatus further includes the memory.

According to a seventh aspect, an embodiment of this application provides a communications apparatus. The communications apparatus is a policy control function PCF network element and includes at least one processor, and the at least one processor is configured to: be coupled to a memory, and read and execute instructions in the memory, to implement the method according to any one of the possible implementations of the third aspect.

In a possible implementation, the communications apparatus further includes the memory.

In the fifth, sixth, and seventh aspects of this application, composite modules of the V2X control network element, the user data management network element, and the PCF network element may further perform the steps described in the methods and the various possible implementations. For details, refer to the foregoing descriptions of the methods and the various possible implementations.

According to an eighth aspect, an embodiment of this application provides a communications system. The communications system includes the vehicle-to-everything V2X control network element according to any one of the possible implementations of the fifth aspect and the user data management network element according to any one of the possible implementations of the sixth aspect.

In a possible implementation, the communications system further includes the policy control function PCF network element according to any one of the possible implementations of the seventh aspect.

According to a ninth aspect, an embodiment of this application provides a communication method, including: a vehicle-to-everything V2X control network element receives parameter delivery notification information sent by a policy control function PCF network element, where the parameter delivery notification information is used to notify the V2X control network element that the PCF network element sends a V2X parameter to a terminal device. The V2X control network element receives parameter update notification information sent by a user data management network element, where the parameter update notification information is used to notify the V2X control network element that the V2X parameter is updated. The V2X control network element sends an updated V2X parameter to the terminal device based on the parameter delivery notification information and the parameter update notification information. In this embodiment of this application, the V2X control network element may receive the parameter delivery notification information from the PCF, and may further receive the parameter update notification information from the user data management network element. The V2X control network element may send the updated V2X parameter to the terminal device based on the two types of received notification information. Therefore, the terminal device may obtain the updated V2X parameter from the V2X control network element, and the terminal device may perform communication by using the updated V2X parameter, to resolve a problem that communication fails because the terminal device uses an expired V2X parameter.

In a possible implementation, that the V2X control network element sends an updated V2X parameter to the terminal device based on the parameter delivery notification information and the parameter update notification information includes: the V2X control network element determines, based on the parameter delivery notification information and the parameter update notification information, that the V2X parameter needs to be updated, and sends the updated V2X parameter to the terminal device. After the V2X control network element receives the parameter delivery notification information and the parameter update notification information, the V2X control network element may compare and analyze content notified based on the parameter delivery notification information and content notified based on the parameter update notification information, and the V2X control network element may determine that the V2X parameter of the terminal device needs to be updated. That the V2X parameter needs to be updated means that the V2X parameter used on the terminal device has changed, and therefore the V2X parameter needs to be updated. In response to a fact that the V2X parameter needs to be updated, the V2X control network element may send the updated V2X parameter to the terminal device, so that the terminal device can obtain the updated V2X parameter in a timely manner.

In a possible implementation, that the V2X control network element determines, based on the parameter delivery notification information and the parameter update notification information, that the V2X parameter needs to be updated includes: the V2X control network element determines a first moment based on the parameter delivery notification information, and determines a second moment based on the parameter update notification information. The V2X control network element determines, based on the first moment and the second moment, that the V2X parameter needs to be updated.

In a possible implementation, the first moment is a moment at which the V2X parameter is sent and that is carried in the parameter delivery notification information, or the first moment is a moment at which the parameter delivery notification information is received; and the second moment is a moment at which the V2X parameter is updated and that is carried in the parameter update notification information, or the second moment is a moment at which the parameter update notification information is received. The V2X control network element may determine the first moment based on the parameter delivery notification information sent by the PCF network element, where the first moment may be the moment at which the V2X parameter is sent and that is carried in the parameter delivery notification information, or may be a moment recorded according to an indication of the parameter delivery notification information. The V2X control network element may further determine the second moment based on the parameter update notification information sent by the user data management network element, where the second moment may be the moment at which the V2X parameter is updated and that is carried in the parameter update notification information, or may be a moment recorded according to an indication of the parameter update notification information. The V2X control network element compares the obtained first moment and the obtained second moment, and determines, based on the first moment and the second moment, that the V2X parameter needs to be updated. For example, when the first moment and the second moment meet a preset condition, the V2X control network element determines that the V2X parameter needs to be updated. For example, when the first moment is different from the second moment, the V2X control network element determines that the V2X parameter needs to be updated.

In a possible implementation, the method further includes: the V2X control network element obtains the updated V2X parameter from the user data management network element. The user data management network element may update the V2X parameter, and store the updated V2X parameter. The user data management network element may interact with the V2X control network element, to provide the updated V2X parameter for the V2X control network element. The user data management network element may send the updated V2X parameter and the parameter update notification information in step 412 in a same message, or may send the updated V2X parameter before or after sending the parameter update notification information. This is not limited herein.

In a possible implementation, that a V2X control network element receives parameter delivery notification information sent by a policy control function PCF network element includes: the V2X control network element receives, by using a network exposure function NEF network element, the parameter delivery notification information sent by the PCF network element. The user data management network element and the V2X control network element may be completed by using the NEF network element. For example, the user data management network element first generates the parameter update notification information, and then sends the parameter update notification information to the NEF network element. After the NEF network element receives the parameter update notification information, the NEF network element may send the parameter update notification information to the V2X control network element, so that the V2X control network element can obtain the parameter update notification information from the user data management network element by using the NEF network element.

In a possible implementation, the parameter update notification information is further used to indicate that the terminal device is reachable in a first network, and the V2X control network element is a network element in the first network. Specifically, the user data management network element sends the parameter update notification information to the V2X control network element, where the parameter update notification information is used to notify the V2X control network element that the terminal device is reachable in the first network, and the V2X control network element may determine that the terminal device is reachable in the first network.

In a possible implementation, that the terminal device is reachable in a first network includes: the terminal device registers with the first network. For example, that the terminal device is reachable in a first network may specifically include: the terminal device registers with the first network. When the terminal device is reachable in the first network, the user data management network element sends the parameter update notification information to the V2X control network element. That the terminal device is reachable in a first network includes: the terminal device registers with the first network.

According to a tenth aspect, an embodiment of this application provides a communication method, including: a user data management network element updates a vehicle-to-everything V2X parameter of a terminal device. The user data management network element sends parameter update notification information to a V2X control network element, where the parameter update notification information is used to notify the V2X control network element that the V2X parameter of the terminal device is updated. In this embodiment of this application, the V2X control network element may receive a parameter delivery notification information from a PCF, and may further receive the parameter update notification information from the user data management network element. The V2X control network element may send the updated V2X parameter to the terminal device based on the two types of received notification information. Therefore, the terminal device may obtain the updated V2X parameter from the V2X control network element, and the terminal device may perform communication by using the updated V2X parameter, to resolve a problem that communication fails because the terminal device uses an expired V2X parameter.

In a possible implementation, that a user data management network element updates a vehicle-to-everything V2X parameter of a terminal device includes at least one of the following cases: when determining that the terminal device is in an unreachable state, the user data management network element determines that the V2X parameter is updated; when determining that the terminal device is in a deregistered state, the user data management network element determines that the V2X parameter is updated; and when determining that the V2X parameter stored by the user data management network element changes, the user data management network element determines that the V2X parameter is updated.

In a possible implementation, the parameter update notification information carries information about a moment at which the user data management network element updates the V2X parameter; or the parameter update notification information is used to indicate the V2X control network element to record a moment at which the parameter update notification message is received. A moment at which the PCF network element sends the V2X parameter is a moment at which the PCF network element sends the V2X parameter to the terminal device. The moment at which the PCF network element sends the V2X parameter may include a moment at which the PCF network element sends a V2X parameter used in a 4G communications system to the terminal device. The V2X parameter may include the V2X parameter used in the 4G communications system. For example, the moment at which the PCF network element sends the V2X parameter may be a timestamp. When the V2X control network element receives the parameter delivery notification information, the V2X control network element may obtain the moment at which the PCF network element sends the V2X parameter to the terminal device.

In a possible implementation, the parameter update notification information is further used to indicate that the terminal device is reachable in a first network. Specifically, the user data management network element sends the parameter update notification information to the V2X control network element, where the parameter update notification information is used to notify the V2X control network element that the terminal device is reachable in the first network, and the V2X control network element may determine that the terminal device is reachable in the first network.

In a possible implementation, that the terminal device is reachable in a first network includes: the terminal device successfully registers with the first network. For example, that the terminal device is reachable in a first network may specifically include: the terminal device registers with the first network. When the terminal device is reachable in the first network, the user data management network element sends the parameter update notification information to the V2X control network element. That the terminal device is reachable in a first network includes: the terminal device registers with the first network.

In a possible implementation, the V2X parameter includes at least one of the following: a public land mobile network PLMN list used for communication through a PC5 interface; indication information indicating whether to perform communication through the PC5 interface; a radio resource configuration parameter used for communication through the PC5 interface; network selection policy information used for communication through the PC5 interface; and a mapping relationship between a V2X service and identification information of the terminal device.

According to an eleventh aspect, an embodiment of this application provides a communication method, including: a policy control function PCF network element sends a vehicle-to-everything V2X parameter to a terminal device. The PCF network element sends parameter delivery notification information to a V2X control network element, where the parameter delivery notification information is used to notify the V2X control network element that the PCF network element sends the V2X parameter to the terminal device. In this embodiment of this application, the V2X control network element may receive the parameter delivery notification information from the PCF, and may further receive parameter update notification information from a user data management network element. The V2X control network element may send an updated V2X parameter to the terminal device based on the two types of received notification information. Therefore, the terminal device may obtain the updated V2X parameter from the V2X control network element, and the terminal device may perform communication by using the updated V2X parameter, to resolve a problem that communication fails because the terminal device uses an expired V2X parameter.

In a possible implementation, the parameter delivery notification information carries a moment at which the PCF network element sends the V2X parameter; or the parameter delivery notification information is used to indicate the V2X control network element to record a moment at which the parameter delivery notification message is received.

In a possible implementation, that the PCF network element sends parameter delivery notification information to a V2X control network element includes: the PCF network element sends the parameter delivery notification information to the V2X control network element by using a network exposure function NEF network element. The PCF network element and the V2X control network element may be completed by using the NEF network element. For example, the PCF network element first generates the parameter delivery notification information, and then sends the parameter delivery notification information to the NEF network element. After the NEF network element receives the parameter delivery notification information, the NEF network element may send the parameter delivery notification information to the V2X control network element, so that the V2X control network element can obtain the parameter delivery notification information from the PCF network element by using the NEF network element.

According to a twelfth aspect, an embodiment of this application provides a communications apparatus. The communications apparatus is a vehicle-to-everything V2X control network element and includes at least one processor, and the at least one processor is configured to: be coupled to a memory, and read and execute instructions in the memory, to implement the method according to any one of the possible implementations of the ninth aspect.

In a possible implementation, the communications apparatus further includes the memory.

According to a thirteenth aspect, an embodiment of this application provides a communications apparatus. The communications apparatus is a user data management network element and includes at least one processor, and the at least one processor is configured to: be coupled to a memory, and read and execute instructions in the memory, to implement the method according to any one of the possible implementations of the tenth aspect.

In a possible implementation, the communications apparatus further includes the memory.

According to a fourteenth aspect, an embodiment of this application provides a communications apparatus. The communications apparatus is a policy control function PCF network element and includes at least one processor, and the at least one processor is configured to: be coupled to a memory, and read and execute instructions in the memory, to implement the method according to any one of the possible implementations of the eleventh aspect.

In a possible implementation, the communications apparatus further includes the memory.

According to a fifteenth aspect, an embodiment of this application provides a communications system. The communications system includes the vehicle-to-everything V2X control network element according to any one of the possible implementations of the twelfth aspect, the user data management network element according to any one of the possible implementations of the thirteenth aspect, and the policy control function PCF network element according to any one of the possible implementations of the fourteenth aspect.

According to a sixteenth aspect, an embodiment of this application provides a computer-readable storage medium. The computer-readable storage medium stores instructions, and when the instructions are run on a computer, the computer is enabled to perform the method according to the first aspect to the fourth aspect and the method according to the ninth aspect to the eleventh aspect.

According to a seventeenth aspect, an embodiment of this application provides a computer program product including instructions. When the computer program product runs on a computer, the computer is enabled to perform the method according to the first aspect to the fourth aspect and the method according to the ninth aspect to the eleventh aspect.

According to an eighteenth aspect, this application provides a chip system. The chip system includes a processor, configured to support the V2X control network element, the user data management network element, and the PCF network element in implementing the functions in the foregoing aspects, for example, sending or processing the data and/or the information in the foregoing methods. In a possible design, the chip system further includes a memory. The memory is configured to store program instructions and data that are necessary for the V2X control network element, the user data management network element, and the PCF network element. The chip system may include a chip, or may include a chip and another discrete component.

DESCRIPTION OF EMBODIMENTS

Embodiments of this application provide a communication method, and a communications apparatus and system, so that a terminal device obtains an updated V2X parameter, to resolve a problem that communication fails because the terminal device uses an expired V2X parameter.

The following describes the embodiments of this application with reference to the accompanying drawings.

In the specification, claims, and the accompanying drawings of this application, the terms "first", "second", and the like are intended to distinguish between similar objects but do not necessarily indicate a specific order or sequence. It should be understood that the terms used in such a way are interchangeable in proper cases. This is merely a manner of distinguishing between objects with a same attribute in the embodiments of this application. In addition, the terms "include", "have", and any other variations thereof are intended to cover the non-exclusive inclusion, so that a process, method, system, product, or device that includes a series of units is not limited to those units, but may include other units not expressly listed or inherent to such a process, method, product, or device.

The technical solutions in the embodiments of this application may be applied to various data processing communications systems. For example, a new version of UMTS, namely, E-UTRA, is used in 3GPP long term evolution (LTE) and various versions evolved based on LTE. A 5th generation ("5G" for short) communications system or new radio ("NR" for short) is a next generation communications system under research. In addition, the communications system is further applicable to a future-oriented communications technology, and is applicable to the technical solutions provided in the embodiments of this application. A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems.

Figure 1:
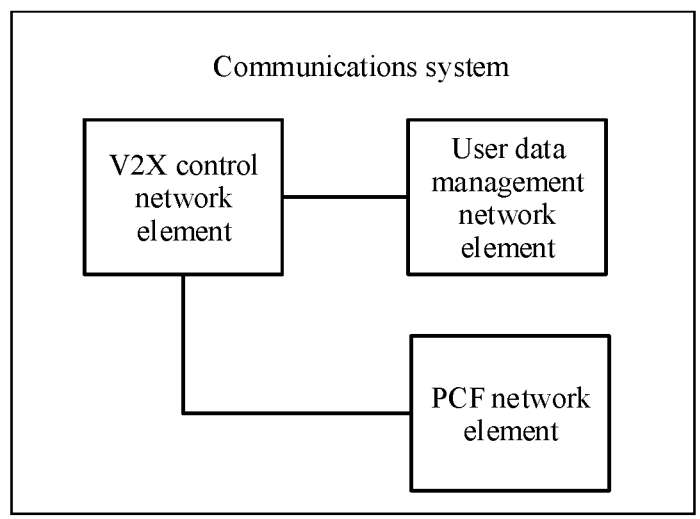
FIG. 1 is a schematic diagram of a composition architecture of a communications system according to an embodiment of this application.

FIG. 1 is a schematic diagram of a composition structure of a communications system according to an embodiment of this application. The communications system provided in this embodiment of this application may include a vehicle-to-everything (V2X) control network element, a user data management network element, and a policy control function (PCF) network element. The V2X control network element is a network element having a control function in a V2X scenario. For example, the V2X control network element may be a V2X control function (V2XCF). Alternatively, the V2X control network element may be another network element having a control function in a 4G communications system. The user data management network element is a network element having a data management function in the V2X scenario. For example, the user data management network element may be a unified data management (UDM) functional entity and a home subscriber server (HSS), or the user data management network element may be a unified data repository (UDR). Alternatively, the user data management network element may be another network element having a terminal device data storage function in the 4G communications system. The PCF network element is a network element that provides policy information. For example, the PCF network element may provide parameter information of a UE policy for UE. For example, the parameter information of the UE policy may include a V2X parameter. Alternatively, the PCF network element may provide parameter information of an access management (AM) policy for an access and mobility management function (AMF) network element, or the PCF network element may provide parameter information of a session management (SM) policy for a session management function (SMF) network element. Specifically, in the V2X scenario, the PCF network element may provide a V2X parameter for UE and a next generation radio access network (NG-RAN). For example, the V2X parameter may include information such as V2X authentication and policy parameters.

It should be noted that for the V2X control network element, the user data management network element, and the PCF network element, the network element may be a functional entity, a software module, a hardware module, a module combining software and hardware, or the like. In addition, names of the V2X control network element, the user data management network element, and the PCF network element are merely a possible implementation. A specific network element name is not limited in this embodiment of this application, and a corresponding network element name may be determined based on a network element function in a specific scenario. In addition, in the following embodiments, the PCF network element may be briefly referred to as a PCF, the AMF network element may be briefly referred to as an AMF, and the SMF network element may be briefly referred to as an SMF.

Figure 2:
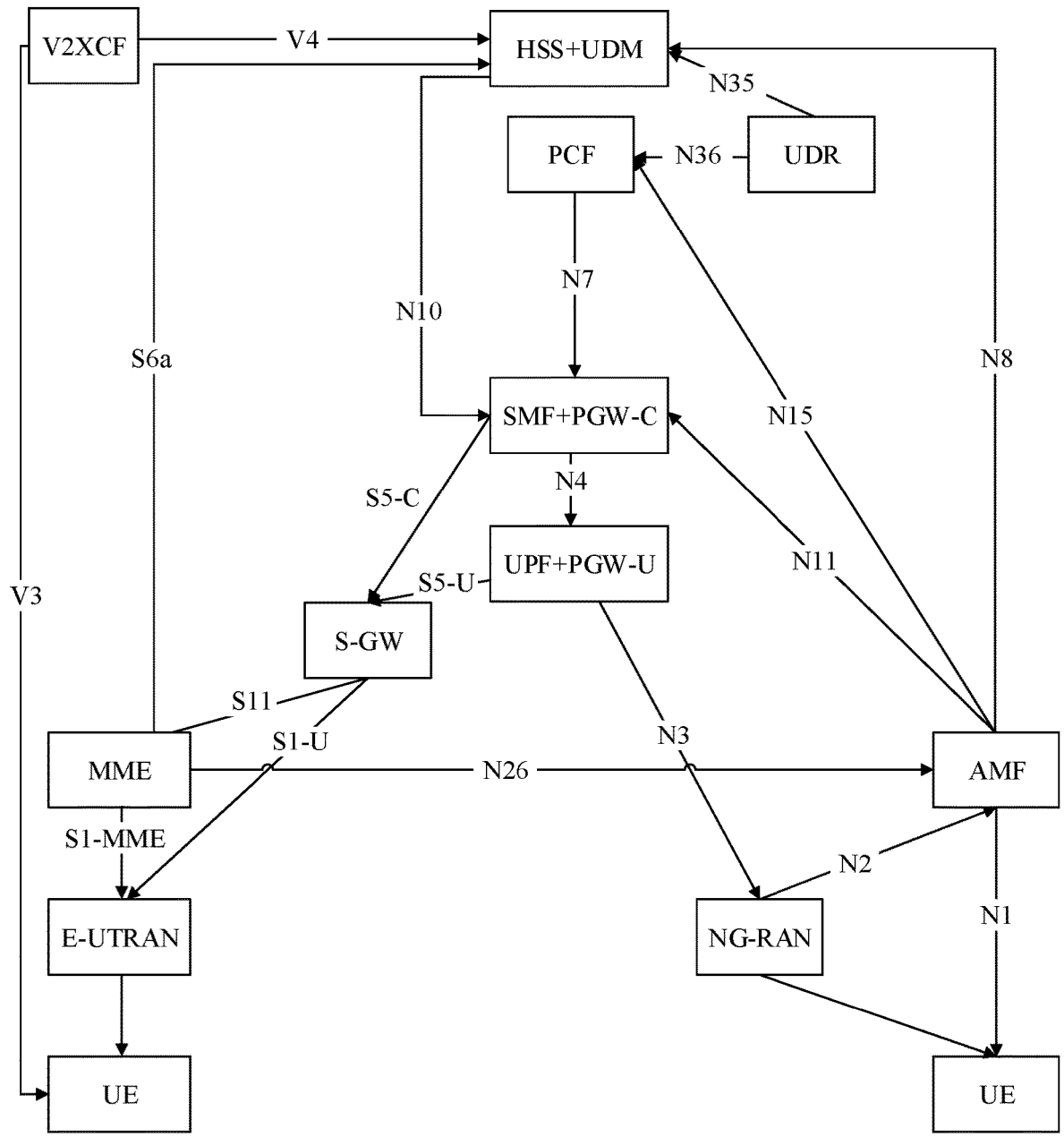
FIG. 2 is a schematic architectural diagram of a combination of a 4G communications system and a 5G communications system according to an embodiment of this application.

FIG. 2 is a schematic architectural diagram of a combination of a 4G communications system and a 5G communications system according to an embodiment of this application. In the combined system architecture shown in FIG. 2, a V2X control network element may be specifically a V2XCF, and a user data management network element may be specifically an HSS+UDM or a UDR. In a 4G communications system, UE communicates with an evolved universal terrestrial radio access network (E-UTRAN), the E-UTRAN is connected to an MME through an S1-MME interface, the E-UTRAN is connected to a serving gateway (S-GW) through an S1-U interface, the MME is connected to the HSS+UDM through an S6a interface, the V2XCF is connected to the UE through a V3 interface, the S-GW is connected to a user plane function (UPF) network element+ packet data gateway for user plane (PGW-U) through an S5-U interface, the S-GW is connected to an SMF+packet data network gateway for control plane (PGW-C) through an S5-C interface, the SMF+PGW-C is connected to the HSS+ UDM through an N10 interface, and the UDR is connected to the HSS+UDM through an N35 interface. In a 5G communications system, UE is connected to an AMF through an N1 interface, the UE communicates with an NG-RAN, the AMF is connected to the NG-RAN through an N2 interface, a UPF+PGW-U is connected to the NG-RAN through an N3 interface, the AMF is connected to an SMF+PGW-C through an N11 interface, the AMF is connected to a PCF through an N15 interface, and the AMF is connected to the HSS+UDM through an N8 interface. In the combined system architecture, the MME is connected to the AMF through an N26 interface, and the PCF is connected to the UDR through an N36 interface. It can be learned from FIG. 2 that the V2XCF may communicate with the UE, and the PCF may communicate with the UDR.

Figure 3:
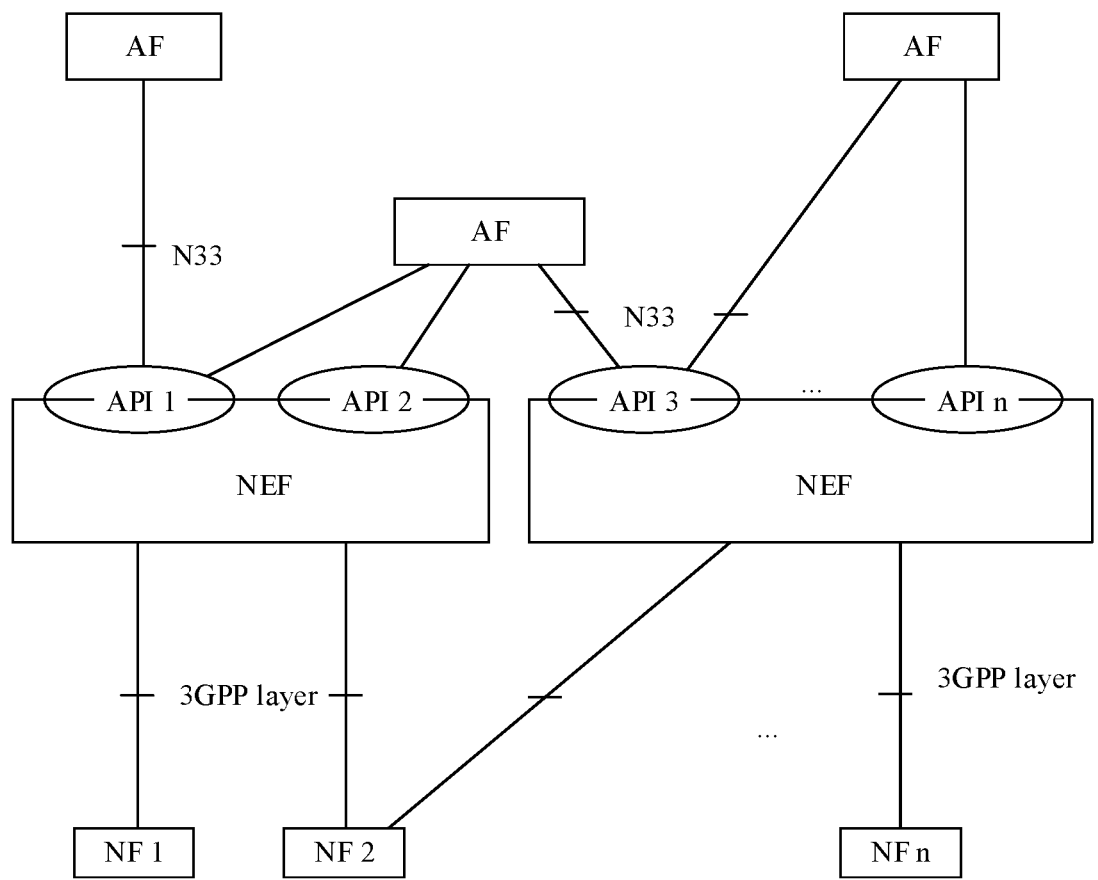
FIG. 3 is a schematic architectural diagram of communication between network elements in a communications system according to an embodiment of this application.

FIG. 3 is a schematic architectural diagram of communication between network elements in a communications system according to an embodiment of this application. In FIG. 3, a network function (NF) network element may communicate with an application function (AF) network element by using a network exposure function (NEF) network element. There may be n NF network elements: an NF 1, an NF 2, . . . , and an NF n. The NF may communicate with the NEF at a 3rd generation partnership project (3GPP) layer. The NEF is an interface through which a core network in a 5G communications system interacts with an external network, and the NF 1 to the NF n represent network elements inside the core network, for example, a UDM, an AMF, and a PCF. The NEF network element is a network element used by a public land mobile network to open data in a network to a third-party application server or to receive data provided by a third-party application server for a network. The NEF network element may have n application programming interfaces (APIs): an API 1, . . . , and an API n. The NEF network element may communicate with the AF through an N33 interface. The AF is a network element outside the core network in the 5G communications system. For example, the AF may be an application server or the foregoing V2XCF in this embodiment of this application.

Figure 4:
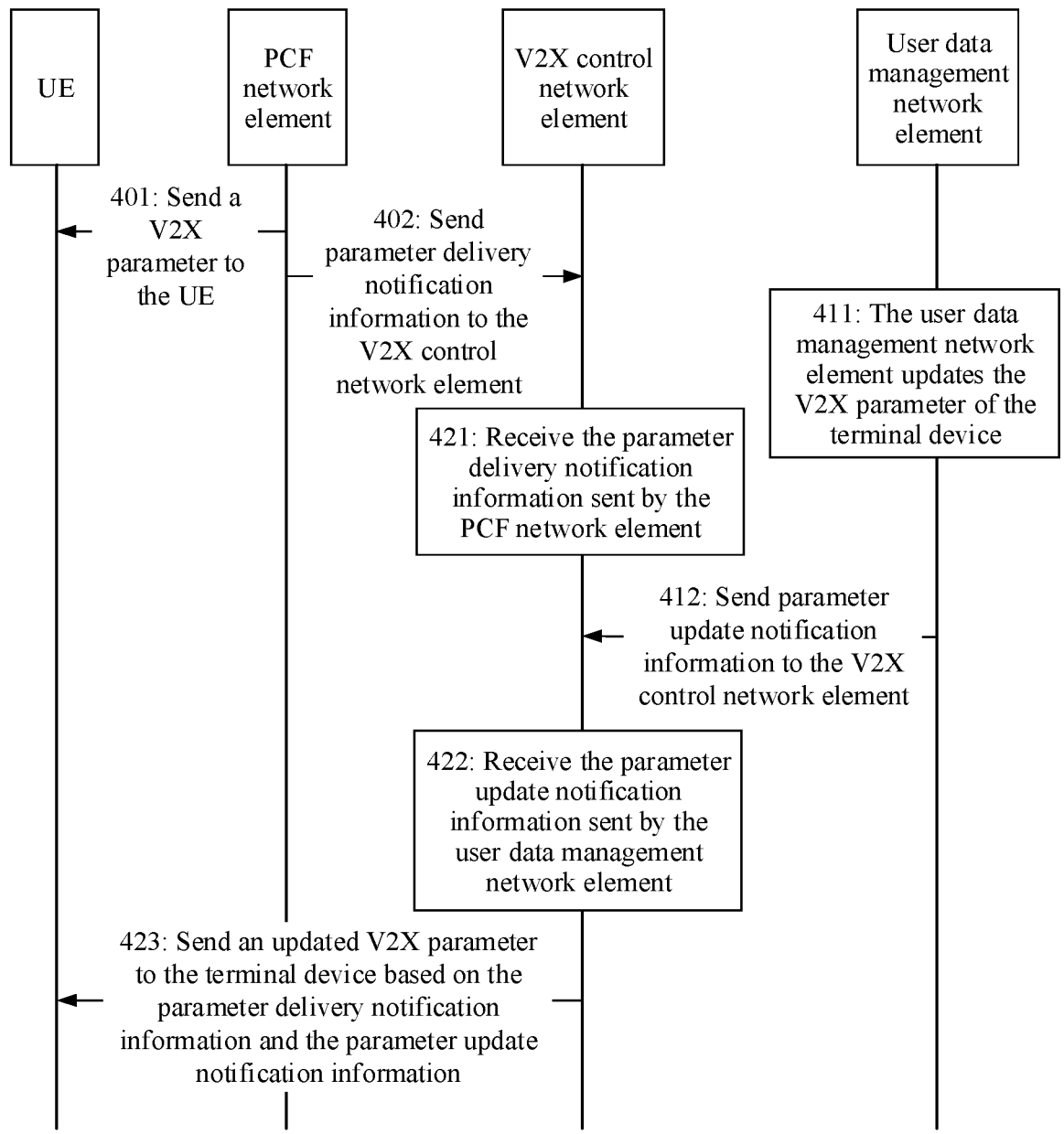
FIG. 4 is a schematic flowchart of interaction between a V2X control network element, a user data management network element, and a PCF network element according to an embodiment of this application.

Based on the foregoing system architecture, the following describes a communication method provided in an embodiment of this application. FIG. 4 is a schematic flowchart of interaction between a V2X control network element, a user data management network element, and a PCF network element according to an embodiment of this application. The communication method provided in this embodiment of this application mainly includes the following steps.

401: The PCF network element sends a V2X parameter to a terminal device.

In this embodiment of this application, the PCF network element may send the V2X parameter to the terminal device. For example, the PCF network element may send the V2X parameter to the terminal device by using an AMF network element. The terminal device may be specifically a terminal such as UE, and the V2X parameter may be a UE parameter used for communication through PC5. For example, the V2X parameter may include authorization information for communication through PC5.

In some embodiments of this application, when the terminal device is located in a second network, the PCF network element may send the V2X parameter to the terminal device. The second network may be a 5G communications network. The V2X parameter may include a V2X parameter used in the second network and a V2X parameter used in a first network. For example, the first network may be a 4G communications network.

In some embodiments of this application, the V2X parameter includes at least one of the following:

a public land mobile network (PLMN) list used for communication through a PC5 interface;

indication information indicating whether to perform communication through the PC5 interface;

a radio resource configuration parameter used for communication through the PC5 interface;

network selection policy information used for communication through the PC5 interface; and a mapping relationship between a V2X service and identification information of the terminal device.

The V2X parameter may be subscription information notified by an HSS to a V2XCF. The public land mobile network PLMN list used for communication through the PC5 interface may be a PLMN list in which UE covered by E-UTRA or NR can perform communication through the PC5 interface. The indication information indicating whether to perform communication through the PC5 interface is information indicating whether UE that is not covered by E-UTRA or NR can perform communication through LTE PC5/NR PC5. For example, the indication information may occupy 1 bit, and a value 0 or 1 indicates whether to perform communication through PC5. The radio resource configuration parameter used for communication through the PC5 interface is a specific radio resource parameter used when UE that is "not covered by E-UTRA or NR" can perform communication through LTE PC5 or NR PC5. For example, the radio resource configuration parameter may include corresponding geographical location information, for example, a list including the geographical location information. The network selection policy information used for communication through the PC5 interface is selection policy information used to select LTE PC5 or NR PC5 for communication, and specifically includes mapping information between a "V2X service" and a "corresponding PC5 interface". For communication through the NR PC5 interface, the V2X parameter may further include a mapping relationship that is between a "V2X service" and "corresponding identification information" and that is used to establish a PC5 unicast connection and perform PC5 multicast and broadcast communication. Specifically, the content included in the V2X parameter may be determined based on an application scenario. This is merely used as an example for description, and is not intended to limit this embodiment of this application.

402: The PCF network element sends parameter delivery notification information to the V2X control network element, where the parameter delivery notification information is used to notify the V2X control network element that the PCF network element sends the V2X parameter to the terminal device.

In this embodiment of this application, after the PCF network element sends the V2X parameter to the terminal device, the PCF network element may send the parameter delivery notification information to the V2X control network element. The parameter delivery notification information sent by the PCF network element is used to notify the V2X control network element that the PCF network element sends the V2X parameter to the terminal device. In other words, the parameter delivery notification information is used to indicate that the PCF network element has sent the V2X parameter to the terminal device. In this case, the V2X control network element that receives the parameter delivery notification information may determine that the PCF network element has sent the V2X parameter to the terminal device.

In some embodiments of this application, step 402 in which the PCF network element sends the parameter delivery notification information to the V2X control network element includes: the PCF network element sends the parameter delivery notification information to the V2X control network element by using a network exposure function NEF network element.

It can be learned from the foregoing system architecture shown in FIG. 3 that the PCF network element and the V2X control network element may be completed by using the NEF network element. For example, the PCF network element first generates the parameter delivery notification information, and then sends the parameter delivery notification information to the NEF network element. After the NEF network element receives the parameter delivery notification information, the NEF network element may send the parameter delivery notification information to the V2X control network element, so that the V2X control network element can obtain the parameter delivery notification information from the PCF network element by using the NEF network element.

It should be noted that in some embodiments of this application, the PCF network element may further directly communicate with the V2X control network element, that is, the PCF network element directly sends the parameter delivery notification information to the V2X control network element without using the NEF network element.

In some embodiments of this application, the parameter delivery notification information carries information about a moment at which the PCF network element sends the V2X parameter.

Alternatively, the parameter delivery notification information is used to indicate the V2X control network element to record a moment at which the parameter delivery notification message is received.

The moment at which the PCF network element sends the V2X parameter is a moment at which the PCF network element sends the V2X parameter to the terminal device.

The moment at which the PCF network element sends the V2X parameter may include a moment at which the PCF network element sends a V2X parameter used in a 4G communications system to the terminal device. The V2X parameter may include the V2X parameter used in the 4G communications system. For example, the moment at which the PCF network element sends the V2X parameter may be a timestamp. When the V2X control network element receives the parameter delivery notification information, the V2X control network element may obtain the moment at which the PCF network element sends the V2X parameter to the terminal device. Without limitation, in this embodiment of this application, in addition to the moment at which the PCF network element sends the V2X parameter, the parameter delivery notification information sent by the PCF network element may further carry address information of the V2X control network element and identification information of the terminal device. Details are not described herein.

In some other embodiments of this application, the parameter delivery notification information may further indicate the V2X control network element to obtain the moment at which the parameter delivery notification message is received. In other words, the parameter delivery notification information may be further used to indicate the V2X control network element to record the moment at which the parameter delivery notification information is received. When the V2X control network element receives the parameter delivery notification information, the V2X control network element may record the moment at which the parameter delivery notification information is received.

411: The user data management network element updates the V2X parameter of the terminal device.

In this embodiment of this application, the user data management network element is a network element having a data management function in a V2X scenario. For example, the user data management network element may be a UDM and an HSS, or the user data management network element may be a UDR. The user data management network element first updates the V2X parameter of the terminal device. In this embodiment of this application, the user data management network element may store the V2X parameter of the terminal device. When the V2X parameter of the terminal device is updated, the user data management network element may update the V2X parameter of the terminal device. There are a plurality of manners in which the V2X parameter needs to be updated. The following uses an example for description.

In some embodiments of this application, step 411 in which the user data management network element updates the vehicle-to-everything V2X parameter of the terminal device includes at least one of the following cases:
when determining that the terminal device is in an unreachable state, the user data management network element determines that the V2X parameter is updated;
when determining that the terminal device is in a deregistered state, the user data management network element determines that the V2X parameter is updated; and
when determining that the V2X parameter stored by the user data management network element changes, the user data management network element determines that the V2X parameter is updated.

When the terminal device is in the unreachable state, the user data management network element determines that the V2X parameter of the terminal device needs to be updated. For another example, when the terminal device is in the deregistered state, the user data management network element determines that the V2X parameter of the terminal device needs to be updated. For another example, when the V2X parameter stored by the user data management network element changes, for example, subscription data of a user changes. For example, previous subscription information of the user includes a value-added service, includes a plurality of public land mobile networks, and may support a relatively high maximum transmission rate on a PC5 interface. However, the user cancels the value-added service due to some reasons, and consequently the maximum transmission rate on the PC5 interface decreases. For another example, previous subscription information of a user supports communication through PC5 in a plurality of public land mobile networks. However, because the subscription information changes, supported operators change, or the V2X parameter has expired. Based on the foregoing examples, the user data management network element may accurately learn that the V2X parameter is updated.

412: The user data management network element sends parameter update notification information to the V2X control network element, where the parameter update notification information is used to notify the V2X control network element that the user data management network element updates the V2X parameter.

In this embodiment of this application, after the user data management network element updates the V2X parameter, the user data management network element may send the parameter update notification information to the V2X control network element. The parameter update notification information sent by the user data management network element is used to notify the V2X control network element that the user data management network element has updated the V2X parameter. In this case, the V2X control network element that receives the parameter update notification information may determine that the user data management network element has updated the V2X parameter.

In some embodiments of this application, step 412 in which the user data management network element sends the parameter update notification information to the V2X control network element includes: the user data management network element sends the parameter update notification information to the V2X control network element by using the NEF network element.

It can be learned from the foregoing system architecture shown in FIG. 3 that the user data management network element and the V2X control network element may be completed by using the NEF network element. For example, the user data management network element first generates the parameter update notification information, and then sends the parameter update notification information to the NEF network element. After the NEF network element receives the parameter update notification information, the NEF network element may send the parameter update notification information to the V2X control network element, so that the V2X control network element can obtain the parameter update notification information from the user data management network element by using the NEF network element.

It should be noted that in some embodiments of this application, the user data management network element may further directly communicate with the V2X control network element, that is, the user data management network element directly sends the parameter update notification information to the V2X control network element without using the NEF network element.

In some embodiments of this application, the parameter update notification information carries a moment at which the user data management network element updates the V2X parameter.

Alternatively, the parameter update notification information indicates the V2X control network element to obtain a moment at which the parameter update notification message is received.

The moment at which the user data management network element updates the V2X parameter is a moment recorded by the user data management network element when the user data management network element updates the V2X parameter. For example, the moment at which the user data management network element updates the V2X parameter may be a timestamp. When the V2X control network element receives the parameter update notification information, the V2X control network element may obtain the moment at which the user data management network element updates the V2X parameter. Without limitation, in this embodiment of this application, in addition to the moment at which the user data management network element updates the V2X parameter, the parameter update notification information sent by the user data management network element may further carry address information of the V2X control network element and identification information of the terminal device. Details are not described herein.

In some other embodiments of this application, the parameter update notification information may further indicate the V2X control network element to obtain the moment at which the parameter update notification message is received. In other words, the parameter update notification information may be further used to indicate the V2X control network element to store the moment at which the parameter update notification information is received. When the V2X control network element receives the parameter update notification information, the V2X control network element may store the moment at which the parameter update notification information is received.

In some embodiments of this application, in the communication method provided in this embodiment of this application, the parameter update notification information is further used to indicate that the terminal device is reachable in a first network.

Specifically, the user data management network element sends the parameter update notification information to the V2X control network element, where the parameter update notification information is used to notify the V2X control network element that the terminal device is reachable in the first network, and the V2X control network element may determine that the terminal device is reachable in the first network.

In a possible implementation, that the terminal device is reachable in a first network includes: the terminal device successfully registers with the first network.

For example, when the terminal device is handed over from a second network to the first network, the user data management network element may determine, by using a mobility management entity, that the terminal device is handed over to the second network. In this case, the user data management network element uses the parameter update notification information to carry information that "the terminal device is reachable in the first network", and sends the parameter update notification information to the V2X control network element, so that the V2X control network element can receive the parameter update notification information from the user data management network element, and the V2X control network element can determine, based on the parameter update notification information, that the terminal device is reachable in the first network. In this way, the V2X control network element senses a reachability status of the terminal device in real time. The first network may be a 4G network, and the second network may be a 5G network.

For example, that the terminal device is reachable in a first network may specifically include: the terminal device registers with the first network. When the terminal device is reachable in the first network, the user data management network element sends the parameter update notification information to the V2X control network element. That the terminal device is reachable in a first network includes: the terminal device registers with the first network.

Without limitation, the parameter update notification information may explicitly indicate that the terminal device is handed over from a second network to the first network, or may only indicate that the terminal device accesses the first network. The V2X control network element determines a handover operation of the terminal device based on the received parameter update notification information.

421: The V2X control network element receives the parameter delivery notification information sent by the PCF network element, where the parameter delivery notification information is used to notify the V2X control network element that the PCF network element sends the V2X parameter to the terminal device.

In this embodiment of this application, when the PCF network element performs step 402, the V2X control network element receives the parameter delivery notification information sent by the PCF network element, and the V2X control network element that receives the parameter delivery notification information may determine that the PCF network element has sent the V2X parameter to the terminal device.

In some embodiments of this application, step 421 in which the V2X control network element receives the parameter delivery notification information sent by the PCF network element includes: the V2X control network element receives, by using the network exposure function NEF network element, the parameter delivery notification information sent by the PCF network element.

It can be learned from the foregoing system architecture shown in FIG. 3 that the user data management network element and the V2X control network element may be completed by using the NEF network element. For example, the user data management network element first generates the parameter delivery notification information, and then sends the parameter delivery notification information to the NEF network element. After the NEF network element receives the parameter delivery notification information, the NEF network element may send the parameter delivery notification information to the V2X control network element, so that the V2X control network element can obtain the parameter delivery notification information from the user data management network element by using the NEF network element.

It should be noted that in some embodiments of this application, the user data management network element may further directly communicate with the V2X control network element, that is, the user data management network element directly sends the parameter delivery notification information to the V2X control network element without using the NEF network element.

422: The V2X control network element receives the parameter update notification information sent by the user data management network element, where the parameter update notification information is used to notify the V2X control network element that the V2X parameter is updated.

In this embodiment of this application, when the user data management network element performs step 412, the V2X control network element receives the parameter update notification information sent by the user data management network element, and the V2X control network element that receives the parameter update notification information may determine that the user data management network element has updated the V2X parameter.

423: The V2X control network element sends an updated V2X parameter to the terminal device based on the parameter delivery notification information and the parameter update notification information.

In this embodiment of this application, after the V2X control network element receives the parameter delivery notification information and the parameter update notification information, the V2X control network element compares and analyzes the parameter delivery notification information and the parameter update notification information, and the V2X control network element may send the updated V2X parameter to the terminal device. Therefore, the terminal device may obtain the updated V2X parameter in a timely manner, and the terminal device may perform communication by using the updated V2X parameter, to resolve a problem that communication fails because the terminal device uses an expired V2X parameter.

For example, the V2X control network element may send a latest V2X parameter to the terminal device in a device trigger process. Alternatively, the V2X control network element may trigger, in a device trigger process, the terminal device to establish a packet data network (PDN) connection, and then the terminal device may request a latest V2X parameter from the V2X control network element. The V2X control network element may send the latest V2X parameter based on the request of the terminal device.

In some embodiments of this application, step 423 in which the V2X control network element sends the updated V2X parameter to the terminal device based on the parameter delivery notification information and the parameter update notification information includes: the V2X control network element determines, based on the parameter delivery notification information and the parameter update notification information, that the V2X parameter needs to be updated, and sends the updated V2X parameter to the terminal device.

After the V2X control network element receives the parameter delivery notification information and the parameter update notification information, the V2X control network element may compare and analyze content notified based on the parameter delivery notification information and content notified based on the parameter update notification information, and the V2X control network element may determine that the V2X parameter of the terminal device needs to be updated. That the V2X parameter needs to be updated means that the V2X parameter used on the terminal device has changed, and therefore the V2X parameter needs to be updated. In response to a fact that the V2X parameter needs to be updated, the V2X control network element may send the updated V2X parameter to the terminal device, so that the terminal device can obtain the updated V2X parameter in a timely manner.

In some embodiments of this application, that the V2X control network element determines, based on the parameter delivery notification information and the parameter update notification information, that the V2X parameter needs to be updated includes: the V2X control network element determines a first moment based on the parameter delivery notification information, and determines a second moment based on the parameter update notification information; and the V2X control network element determines, based on the first moment and the second moment, that the V2X parameter needs to be updated.

The V2X control network element may determine the first moment based on the parameter delivery notification information sent by the PCF network element, where the first moment may be the moment at which the V2X parameter is sent and that is carried in the parameter delivery notification information, or may be a moment recorded according to an indication of the parameter delivery notification information. The V2X control network element may further determine the second moment based on the parameter update notification information sent by the user data management network element, where the second moment may be the moment at which the V2X parameter is updated and that is carried in the parameter update notification information, or may be a moment recorded according to an indication of the parameter update notification information. The V2X control network element compares the obtained first moment and the obtained second moment, and determines, based on the first moment and the second moment, that the V2X parameter needs to be updated. For example, when the first moment and the second moment meet a preset condition, the V2X control network element determines that the V2X parameter needs to be updated. For example, when the first moment is different from the second moment, the V2X control network element determines that the V2X parameter needs to be updated.

In some embodiments of this application, before the V2X control network element sends the updated V2X parameter to the terminal device, the communication method provided in this embodiment of this application may further include the following step: the V2X control network element obtains the updated V2X parameter from the user data management network element.

The user data management network element may update the V2X parameter, and store the updated V2X parameter. The user data management network element may interact with the V2X control network element, to provide the updated V2X parameter for the V2X control network element.

It should be noted that the user data management network element may send the updated V2X parameter and the parameter update notification information in step 412 in a same message, or may send the updated V2X parameter before or after sending the parameter update notification information. This is not limited herein.

In some embodiments of this application, the parameter update notification information is further used to indicate that the terminal device is reachable in a first network, and the V2X control network element is a network element in the first network.

Specifically, the user data management network element sends the parameter update notification information to the V2X control network element, where the parameter update notification information is used to notify the V2X control network element that the terminal device is reachable in the first network, and the V2X control network element may determine that the terminal device is reachable in the first network.

In a possible implementation, that the terminal device is reachable in a first network includes: the terminal device successfully registers with the first network.

For example, when the terminal device is handed over from a second network to the first network, the user data management network element may determine, by using a mobility management entity, that the terminal device is handed over to the second network. In this case, the user data management network element uses the parameter update notification information to carry information that "the terminal device is reachable in the first network", and sends the parameter update notification information to the V2X control network element, so that the V2X control network element can receive the parameter update notification information from the user data management network element, and the V2X control network element can determine, based on the parameter update notification information, that the terminal device is reachable in the first network. In this way, the V2X control network element senses a reachability status of the terminal device in real time. The first network may be a 4G network, and the second network may be a 5G network.

For example, that the terminal device is reachable in a first network may specifically include: the terminal device registers with the first network. When the terminal device is reachable in the first network, the user data management network element sends the parameter update notification information to the V2X control network element. That the terminal device is reachable in a first network includes: the terminal device registers with the first network.

Without limitation, the parameter update notification information may explicitly indicate that the terminal device is handed over from a second network to the first network, or may only indicate that the terminal device accesses the first network. The V2X control network element determines a handover operation of the terminal device based on the received parameter update notification information.

It can be learned from the descriptions of the foregoing embodiment that the V2X control network element receives the parameter delivery notification information sent by the PCF network element, where the parameter delivery notification information is used to notify the V2X control network element that the PCF network element sends the V2X parameter to the terminal device. The V2X control network element receives the parameter update notification information sent by the user data management network element, where the parameter update notification information is used to notify the V2X control network element that the user data management network element updates the V2X parameter. The V2X control network element sends the updated V2X parameter to the terminal device based on the parameter delivery notification information and the parameter update notification information. In this embodiment of this application, the V2X control network element may receive the parameter delivery notification information from the PCF, and may further receive the parameter update notification information from the user data management network element. The V2X control network element may send the updated V2X parameter to the terminal device based on the two types of received notification information. Therefore, the terminal device may obtain the updated V2X parameter from the V2X control network element, and the terminal device may perform communication by using the updated V2X parameter, to resolve a problem that communication fails because the terminal device uses an expired V2X parameter.

To better understand and implement the foregoing solutions in the embodiments of this application, the following uses a corresponding application scenario as an example for specific description.

Figure 5:
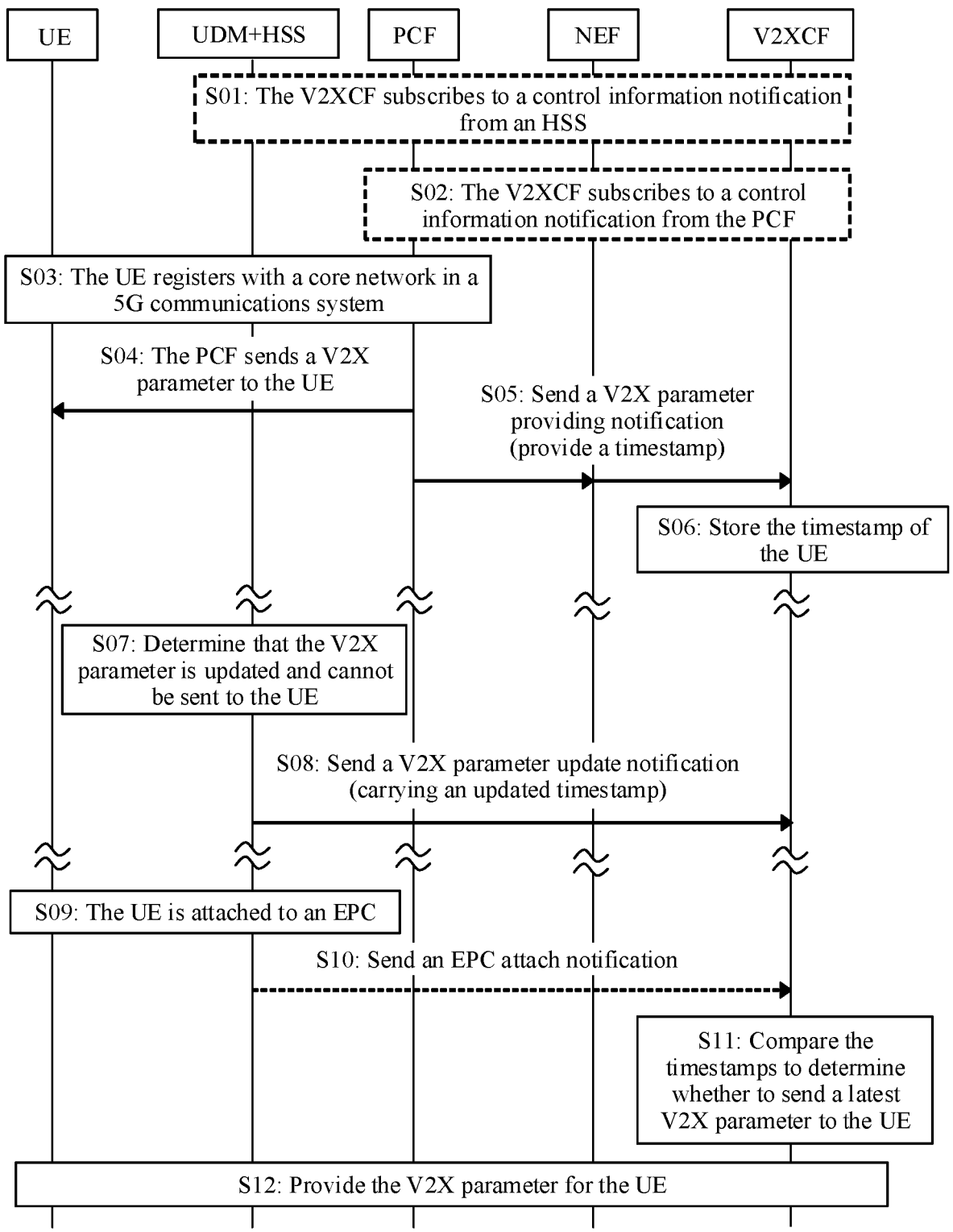
FIG. 5 is a schematic interaction flowchart of a communication method in an interaction scenario according to an embodiment of this application.

FIG. 5 is a schematic interaction flowchart of a communication method in an interaction scenario according to an embodiment of this application. Descriptions are provided by using an example in which a V2X control network element is specifically a V2XCF, a terminal device is specifically UE, and a user data management network element is specifically a UDM+HSS. The communication method mainly includes the following procedure.

S01: The V2XCF subscribes to a control information notification from an HSS.

The V2XCF subscribes to the control information notification from the HSS, so that the HSS sends updated control information to the V2XCF.

S02: The V2XCF subscribes to a control information notification from a PCF.

The V2XCF subscribes to the control information notification from the PCF, so that the PCF sends updated control information to the V2XCF.

S03: The UE registers with a core network in a 5G communications system.

The UE may register with the core network in the 5G system. A specific registration procedure is not described.

S04: The PCF sends a V2X parameter to the UE.

The V2X parameter used by the UE for communication through PC5 may be sent by the PCF to the UE by using an AMF in a UE configuration update process initiated by the PCF. A message that can be used by the PCF is a UE configuration update (UCU for short) command message, and policy information included in the message is a V2X parameter used for V2X communication.

S05: The PCF sends a V2X parameter providing notification (provides a timestamp).

After providing the V2X parameter for the UE, the PCF sends a message to the V2XCF, where the message is used to notify the V2XCF that the PCF has provided the parameter for the UE. Optionally, the message may include information about a moment at which the PCF sends the UE configuration update command message to the UE. Descriptions are provided below by using examples.

The PCF may send the message to the V2XCF by using an NEF. A specific process may be as follows.

The PCF sends a message to the NEF, where the message is used to indicate the NEF to send the message "used to notify the V2XCF that the PCF has provided the parameter for the UE" to the V2XCF. Optionally, the message sent by the PCF to the NEF may include the information about the moment at which the PCF sends the UE configuration update command message to the UE, address information of the V2XCF, and corresponding identification information of the UE. For example, the identifier of the UE may be a subscriber permanent identifier (SUPI).

In addition, the PCF directly sends the message to the V2XCF. A specific process may be as follows: the PCF sends the message "used to notify the V2XCF that the PCF has provided the parameter for the UE" to the V2XCF. Optionally, the message may include the information about the moment at which the PCF sends the UE configuration update command message to the UE and corresponding identification information (which may be an SUPI) of the UE.

506: The V2XCF stores the timestamp of the UE.

After the V2XCF receives the message, the V2XCF may obtain a corresponding moment at which the PCF sends the message. The corresponding moment may be directly included in the message sent by the PCF, or may be a moment at which the V2XCF receives the message. The V2XCF stores the corresponding moment.

507: The UDM+HSS determines that the V2X parameter is updated and cannot be sent to the UE.

508: The UDM+HSS sends a V2X parameter update notification (carrying an updated timestamp).

When the parameter of the UE needs to be updated, the UDM+HSS notifies the V2XCF that the parameter of the UE is updated. Optionally, the message may include information about a moment at which the UDM+HSS updates the parameter of the UE. For example, the UDM+HSS may send the message to the V2XCF by using the NEF. A specific process may be as follows: the UDM+HSS sends a message to the NEF, where the message is used to indicate the NEF to send the message "used to notify the V2XCF that the parameter of the UE is updated" to the V2XCF. Optionally, the message sent by the UDM+HSS to the NEF may include the information about the moment at which the UDM+HSS updates the parameter of the UE, address information of the V2XCF, and corresponding identification information (which may be an SUPI) of the UE.

In addition, the UDM+HSS directly sends the message to the V2XCF. A specific process may be as follows: the UDM+HSS sends the message "used to notify the V2XCF that the parameter of the UE is updated" to the V2XCF. Optionally, the message may include the information about the moment at which the UDM+HSS updates the parameter of the UE and corresponding identification information (which may be an SUPI) of the UE.

509: The UE is attached to an evolved packet core (EPC).

510: Send an EPC attach notification.

The UE is attached to the EPC. In this case, optionally, that the UDM+HSS sends indication information to the V2XCF may specifically include: the UDM+HSS notifies the V2XCF that the UE has accessed a network.

S11: Compare the timestamps to determine whether to send a latest V2X parameter to the UE.

If the V2XCF finds that the parameter of the UE needs to be updated, the V2XCF triggers a parameter update procedure. Specifically, the step may be implemented in the following procedure: the V2XCF finds, by comparing corresponding moments at which the messages are respectively received from the PCF and the UDM+HSS, that the V2X parameter stored by the UE needs to be updated.

S12: Provide the V2X parameter for the UE.

The V2XCF sends the latest parameter to the UE in a device trigger process. Alternatively, the V2XCF triggers, in a device trigger process, the UE to establish a PDN connection, so as to communicate with the V2XCF.

It can be learned from the descriptions of the foregoing examples that in this embodiment of this application, when providing the parameter of the UE, the PCF notifies a related V2XCF of the provided timestamp. This method does not involve modification of an EPC network element such as an MME, and has little impact on a current 4G standard. The V2XCF compares the two stored moments to determine that the V2X parameter stored by the UE needs to be updated, and then triggers, in the existing device trigger process, the UE to initiate a V2X parameter obtaining procedure. According to the foregoing embodiment, a problem that the V2X parameter of the UE is inconsistent with a V2X parameter in the core network is resolved.

Figure 6:
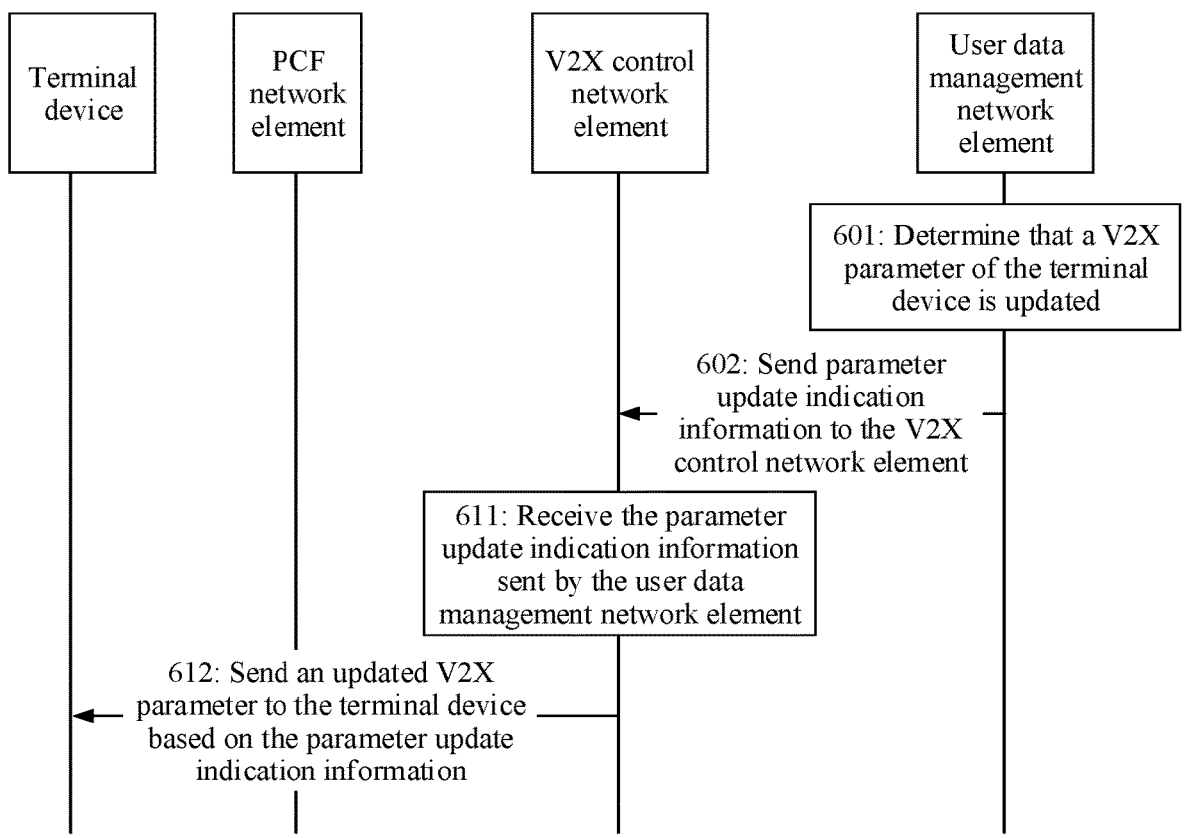
FIG. 6 is another schematic flowchart of interaction between a V2X control network element and a user data management network element according to an embodiment of this application.

Based on the foregoing system architecture, the following describes a communication method provided in an embodiment of this application. FIG. 6 is a schematic flowchart of interaction between a V2X control network element and a user data management network element according to an embodiment of this application. The communication method provided in this embodiment of this application mainly includes the following steps.

601: The user data management network element determines that a V2X parameter of a terminal device is updated.

In this embodiment of this application, the user data management network element is a network element having a data management function in a V2X scenario. For example, the user data management network element may be a UDM and an HSS, or the user data management network element may be a UDR. The user data management network element first updates the V2X parameter of the terminal device. In this embodiment of this application, the user data management network element may store the V2X parameter of the terminal device. When the V2X parameter of the terminal device is updated, the user data management network element may update the V2X parameter of the terminal device. There are a plurality of manners in which the V2X parameter needs to be updated. The following uses an example for description.

In some embodiments of this application, step 601 in which the user data management network element determines that the V2X parameter of the terminal device is updated includes at least one of the following cases:

when determining that the terminal device is in an unreachable state, the user data management network element determines that the V2X parameter is updated;

when determining that the terminal device is in a deregistered state, the user data management network element determines that the V2X parameter is updated; and when determining that the V2X parameter stored by the user data management network element changes, the user data management network element determines that the V2X parameter is updated.

When the terminal device is in the unreachable state, the user data management network element determines that the V2X parameter of the terminal device needs to be updated. For another example, when the terminal device is in the deregistered state, the user data management network element determines that the V2X parameter of the terminal device needs to be updated. For another example, when the V2X parameter stored by the user data management network element changes, for example, subscription data of a user changes. For example, previous subscription information of the user includes a value-added service, includes a plurality of public land mobile networks, and may support a relatively high maximum transmission rate on a PC5 interface. However, the user cancels the value-added service due to some reasons, and consequently the maximum transmission rate on the PC5 interface decreases. For another example, previous subscription information of a user supports communication through PC5 in a plurality of public land mobile networks. However, because the subscription information changes, supported operators change, or the V2X parameter has expired. Based on the foregoing examples, the user data management network element may accurately learn that the V2X parameter is updated.

In some other embodiments of this application, step 601 in which the user data management network element determines that the vehicle-to-everything V2X parameter of the terminal device is updated includes:

the user data management network element receives parameter delivery request information sent by a policy control function PCF network element, where the parameter delivery request information is used to request the V2X parameter from the user data management network element;

the user data management network element determines a first moment based on the parameter delivery request information;

the user data management network element updates the V2X parameter, and obtains a second moment at which the V2X parameter is updated; and the user data management network element determines, based on the first moment and the second moment, that the V2X parameter of the terminal device is updated.

The user data management network element may determine the first moment based on the parameter delivery request information sent by the PCF network element, where the first moment may be a moment determined based on the parameter delivery request information. The user data management network element may further use a moment at which the V2X parameter is updated as the second moment. The user data management network element compares the obtained first moment and the obtained second moment, and determines, based on the first moment and the second moment, that the V2X parameter needs to be updated. For example, when the first moment and the second moment meet a preset condition, the user data management network element determines that the V2X parameter needs to be updated. For example, when the first moment is different from the second moment, the user data management network element determines that the V2X parameter needs to be updated.

In some embodiments of this application, the first moment is a request moment carried in the parameter delivery request information, or the first moment is a moment at which the parameter delivery request information is received.

For example, the first moment may be a moment at which the V2X parameter is requested and that is carried in the parameter delivery request information, or may be a moment recorded according to an indication of the parameter delivery request information.

In some embodiments of this application, an embodiment of this application further provides a communication method performed by a PCF network element. The communication method mainly includes the following steps.

The PCF network element sends parameter delivery request information to a user data management network element, where the parameter delivery request information is used to request a V2X parameter of a terminal device from the user data management network element.

The PCF network element receives the V2X parameter sent by the user data management network element.

When the PCF network element needs to provide the V2X parameter for the terminal device, the PCF network element triggers a procedure of obtaining the V2X parameter from the user data management network element. Specifically, the PCF network element requests the V2X parameter from the user data management network element, and the user data management network element sends a response message to the PCF network element, where the response message includes the V2X parameter.

In some embodiments of this application, the parameter delivery request information carries information about a moment at which the PCF network element requests the V2X parameter.

Alternatively, the parameter delivery request information is used to indicate the user data management network element to record a moment at which the parameter delivery request information is received.

Specifically, the user data management network element may determine a first moment based on the parameter delivery request information sent by the PCF network element, where the first moment may be the moment at which the V2X parameter is requested and that is carried in the parameter delivery request information, or may be the moment at which the parameter delivery request information is received and that is recorded according to the indication of the parameter delivery request information. The user data management network element may determine, based on the first moment determined from the parameter delivery request information and a second moment at which the user data management network element updates the V2X parameter, whether the V2X parameter is updated.

602: The user data management network element sends parameter update indication information to the V2X control network element, where the parameter update indication information is used to indicate that the V2X parameter of the terminal device is updated.

In this embodiment of this application, after the user data management network element updates the V2X parameter, the user data management network element may send the parameter update indication information to the V2X control network element. The parameter update indication information sent by the user data management network element is used to indicate that the V2X parameter of the terminal device is updated. In this case, the V2X control network element that receives the parameter update indication information may determine that the V2X parameter is updated.

611: The V2X control network element receives the parameter update indication information sent by the user data management network element, where the parameter update indication information is used to indicate that the V2X parameter of the terminal device is updated.

In this embodiment of this application, when the user data management network element performs step 602, the V2X control network element receives the parameter update indication information sent by the user data management network element, and the V2X control network element that receives the parameter update indication information may determine that the V2X parameter of the terminal device is updated.

612: The V2X control network element sends an updated V2X parameter to the terminal device based on the parameter update indication information.

In this embodiment of this application, after the V2X control network element receives the parameter update indication information, the V2X control network element determines, according to the parameter update indication information, that the V2X parameter is updated, and the V2X control network element may send the updated V2X parameter to the terminal device. Therefore, the terminal device may obtain the updated V2X parameter in a timely manner, and the terminal device may perform communication by using the updated V2X parameter, to resolve a problem that communication fails because the terminal device uses an expired V2X parameter.

In some embodiments of this application, the parameter update indication information is further used to indicate that the terminal device is reachable in a first network.

Specifically, the user data management network element sends the parameter update indication information to the V2X control network element, where the parameter update indication information is used to notify the V2X control network element that the terminal device is reachable in the first network, and the V2X control network element may determine that the terminal device is reachable in the first network.

In a possible implementation, that the terminal device is reachable in a first network includes: the terminal device successfully registers with the first network.

For example, when the terminal device is handed over from a second network to the first network, the user data management network element may determine, by using a mobility management entity, that the terminal device is handed over to the second network. In this case, the user data management network element uses the parameter update indication information to carry information that "the terminal device is reachable in the first network", and sends the parameter update indication information to the V2X control network element, so that the V2X control network element can receive the parameter update indication information from the user data management network element, and the V2X control network element can determine, based on the parameter update indication information, that the terminal device is reachable in the first network. In this way, the V2X control network element senses a reachability status of the terminal device in real time. The first network may be a 4G network, and the second network may be a 5G network.

For example, that the terminal device is reachable in a first network may specifically include: the terminal device registers with the first network. When the terminal device is reachable in the first network, the user data management network element sends the parameter update indication information to the V2X control network element. That the terminal device is reachable in a first network includes: the terminal device registers with the first network.

Without limitation, the parameter update indication information may explicitly indicate that the terminal device is handed over from a second network to the first network, or may only indicate that the terminal device accesses the first network. The V2X control network element determines a handover operation of the terminal device based on the received parameter update indication information.

In some embodiments of this application, the V2X parameter includes at least one of the following:
a public land mobile network PLMN list used for communication through a PC5 interface;
indication information indicating whether to perform communication through the PC5 interface;
a radio resource configuration parameter used for communication through the PC5 interface;
network selection policy information used for communication through the PC5 interface; and
a mapping relationship between a V2X service and identification information of the terminal device.

The V2X parameter may be subscription information notified by an HSS to a V2XCF. The public land mobile network PLMN list used for communication through the PC5 interface may be a PLMN list in which UE covered by E-UTRA or NR can perform communication through the PC5 interface. The indication information indicating whether to perform communication through the PC5 interface is information indicating whether UE that is not covered by E-UTRA or NR can perform communication through LTE PC5/NR PC5. For example, the indication information may occupy 1 bit, and a value 0 or 1 indicates whether to perform communication through PC5. The radio resource configuration parameter used for communication through the PC5 interface is a specific radio resource parameter used when UE that is "not covered by E-UTRA or NR" can perform communication through LTE PC5 or NR PC5.

For example, the radio resource configuration parameter may include corresponding geographical location information, for example, a list including the geographical location information. The network selection policy information used for communication through the PC5 interface is selection policy information used to select LTE PC5 or NR PC5 for communication, and specifically includes mapping information between a "V2X service" and a "corresponding PC5 interface". For communication through the NR PC5 interface, the V2X parameter may further include a mapping relationship that is between a "V2X service" and "corresponding identification information" and that is used to establish a PC5 unicast connection and perform PC5 multicast and broadcast communication. Specifically, the content included in the V2X parameter may be determined based on an application scenario. This is merely used as an example for description, and is not intended to limit this embodiment of this application.

In some embodiments of this application, before the V2X control network element sends the updated V2X parameter to the terminal device, the communication method provided in this embodiment of this application may further include the following step: the V2X control network element obtains the updated V2X parameter from the user data management network element.

The user data management network element may update the V2X parameter, and store the updated V2X parameter. The user data management network element may interact with the V2X control network element, to provide the updated V2X parameter for the V2X control network element.

It should be noted that the user data management network element may send the updated V2X parameter and the parameter update notification information in step 412 in a same message, or may send the updated V2X parameter before or after sending the parameter update notification information. This is not limited herein.

It can be learned from the descriptions of the foregoing embodiment that the V2X control network element receives the parameter update indication information sent by the user data management network element, where the parameter update indication information is used to indicate that the V2X parameter of the terminal device is updated. The V2X control network element sends the updated V2X parameter to the terminal device based on the parameter update indication information. In this embodiment of this application, the V2X control network element may receive the parameter update indication information from the user data management network element, and the V2X control network element may send the updated V2X parameter to the terminal device based on the received indication information. Therefore, the terminal device may obtain the updated V2X parameter from the V2X control network element, and the terminal device may perform communication by using the updated V2X parameter, to resolve a problem that communication fails because the terminal device uses an expired V2X parameter.

To better understand and implement the foregoing solutions in the embodiments of this application, the following uses a corresponding application scenario as an example for specific description.

Figure 7A:
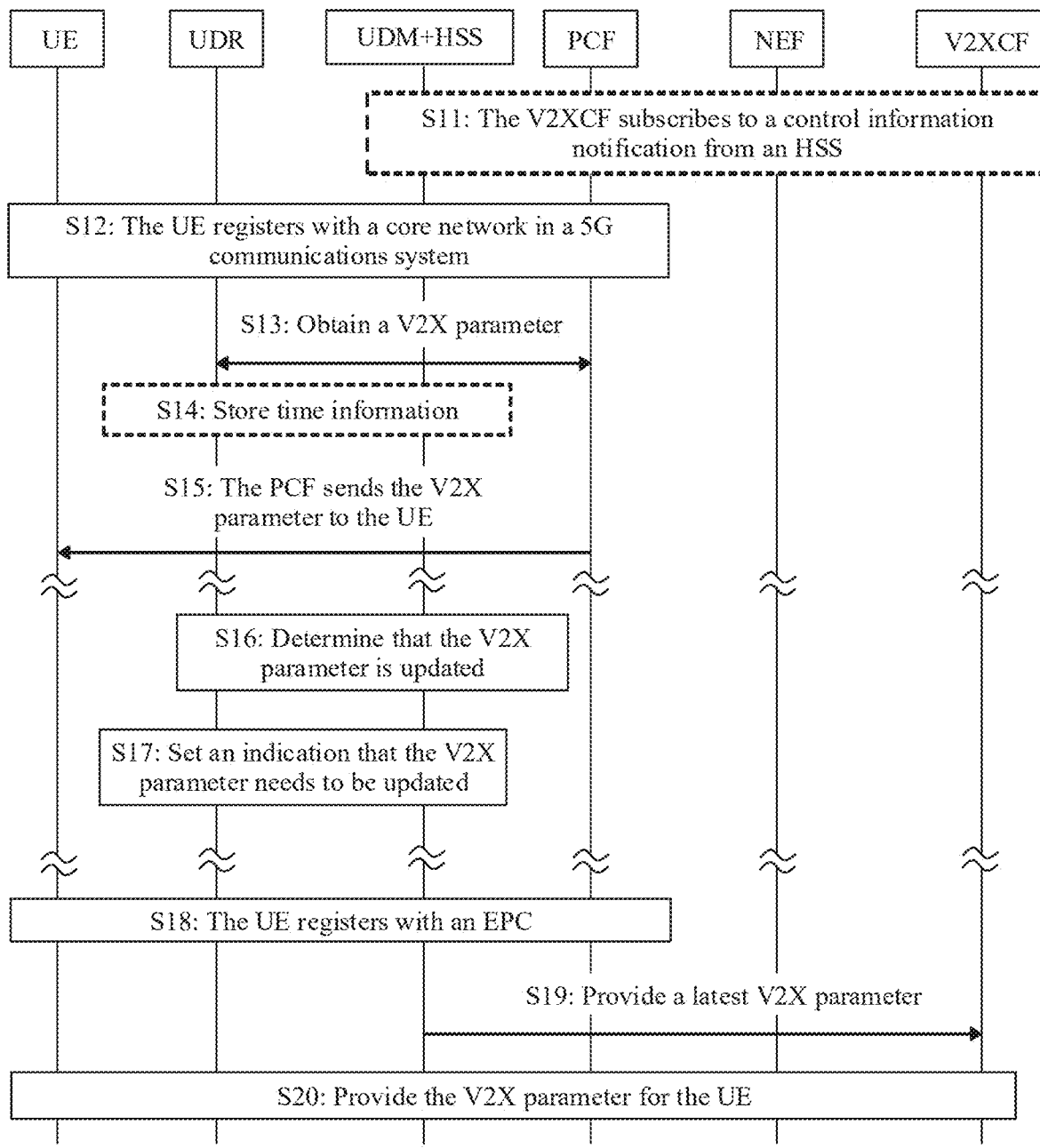
FIG. 7A is a schematic interaction flowchart of a communication method in another interaction scenario according to an embodiment of this application.

FIG. 7A is a schematic interaction flowchart of a communication method in an interaction scenario according to an embodiment of this application. Descriptions are provided by using an example in which a V2X control network element is specifically a V2XCF, a terminal device is specifically UE, and a user data management network element is specifically a UDM+HSS or a UDR. The communication method mainly includes the following procedure.

S11: The V2XCF subscribes to a control information notification from an HSS.

The V2XCF subscribes to the control information notification from the HSS, so that the HSS sends updated control information to the V2XCF.

S12: The UE registers with a core network in a 5G communications system.

The UE may register with the core network in the 5G system. A specific registration procedure is not described.

S13: A PCF obtains a V2X parameter.

When the PCF needs to provide the V2X parameter for the UE, the PCF triggers a procedure of obtaining the V2X parameter from the UDM+HSS/UDR. Specifically, the PCF requests the V2X parameter from the UDM+HSS or the UDR, and the UDM+HSS/UDR sends a response message to the PCF, where the message includes the V2X parameter.

S14: The UDM+HSS/UDR stores information about a moment.

The UDM+HSS/UDR network element stores the information about the moment, where the information about the moment may be a corresponding moment carried when the PCF sends a request, or a corresponding moment at which a request is received from the PCF.

S15: The PCF sends the V2X parameter to the UE.

The V2X parameter used by the UE for communication through PC5 is sent by the PCF to the UE by using an AMF in a UE configuration update process initiated by the PCF. The used message may be a UE configuration update command message, and policy information included in the message is a V2X parameter used for V2X communication.

S16: The UDM+HSS/UDR determines that the V2X parameter is updated.

If the V2X parameter of the UE changes, for example, subscription information of the UE changes, the information may be subscription information stored in the UDM+HSS/UDR.

S17: The UDM+HSS/UDR sets an indication that the V2X parameter needs to be updated.

That the UDM+HSS/UDR records the information that "the parameter needs to be updated on the UE side" may be specifically as follows: the UDM+HSS/UDR records information about a moment at which the UDM+HSS/UDR updates the parameter of the UE, and determines, by comparing a moment at which the parameter is sent to the UE and the moment at which the parameter of the UE is updated, that the parameter on the UE side needs to be updated. Alternatively, when the parameter of the UE needs to be updated, the UDM+HSS/UDR finds that the UE is unreachable. In this case, the UDM+HSS/UDR determines that the parameter on the UE side needs to be updated.

S18: The UE registers with an EPC.

S19: The UDM+HSS provides a latest V2X parameter.

The UE is subsequently attached to the EPC. In a V2X procedure, an MME needs to obtain the parameter of the UE from the HSS. Therefore, the UDM+HSS/UDR learns that the UE registers with a 4G communications network. In this case, the UDM+HSS/UDR sends a message to the V2XCF, to notify the V2XCF that the parameter of the UE needs to be updated. Subsequently, the V2XCF triggers a parameter update procedure. Specifically, the step may be implemented in the following procedure: the V2XCF finds, by comparing corresponding moments at which the messages are respectively received from the PCF and the UDM+HSS, that the V2X parameter stored by the UE needs to be updated.

S20: The V2XCF provides the V2X parameter for the UE.

The V2XCF sends the latest parameter to the UE in a device trigger process. Alternatively, the V2XCF triggers, in a device trigger process, the UE to establish a PDN connection, so as to communicate with the V2XCF.

It can be learned from the descriptions of the foregoing examples that this embodiment of this application provides a method for providing the V2X parameter for the UE through the core network in the 5G communications system. The UDM+HSS determines whether the parameter of the UE needs to be updated, and when the UE accesses the EPC, the UDM+HSS/UDR notifies the V2XCF that the parameter of the UE needs to be updated. According to the foregoing embodiment, a problem that the V2X parameter of the UE is inconsistent with a V2X parameter in the core network is resolved.

Figure 7B:
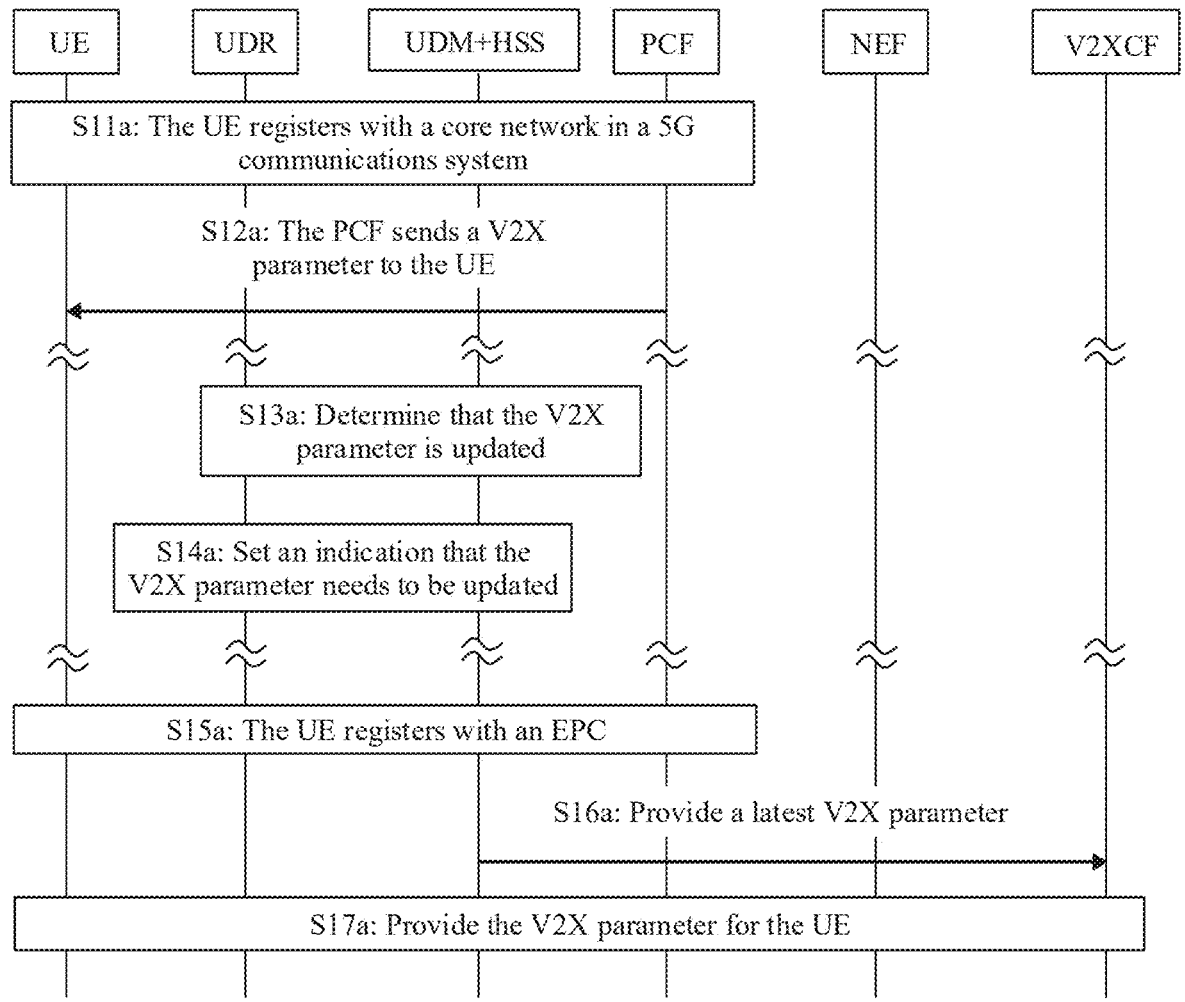
FIG. 7B is a schematic interaction flowchart of a communication method in another interaction scenario according to an embodiment of this application.

The following describes in detail that the HSS+UDM/UDR triggers the parameter update on the UE side based on an update to the subscription information and a condition that the UE is unreachable. FIG. 7B is a schematic interaction flowchart of a communication method in an interaction scenario according to an embodiment of this application. Descriptions are provided by using an example in which a V2X control network element is specifically a V2XCF, a terminal device is specifically UE, and a user data management network element is specifically a UDM+HSS or a UDR. The communication method mainly includes the following procedure.

S11a: The UE registers with a core network in a 5G communications system.

S12a: A PCF sends a V2X parameter to the UE.

The V2X parameter used by the UE for communication through PC5 is sent by the PCF to the UE by using an AMF in a UE configuration update process initiated by the PCF. The used message may be a UE configuration update command message, and policy information included in the message is a V2X parameter used for V2X communication.

S13a: The UDM+HSS/UDR determines that the V2X parameter is updated.

If the V2X parameter of the UE changes, for example, subscription information of the UE changes, the information may be subscription information stored in the UDM+HSS/UDR.

S14a: The UDM+HSS/UDR sets an indication that the V2X parameter needs to be updated.

That the UDM+HSS/UDR records the information that "the parameter needs to be updated on the UE side" may be specifically as follows: when the parameter of the UE needs to be updated, the UDM+HSS/UDR finds that the UE is unreachable. In this case, the UDM+HSS/UDR determines that the parameter on the UE side needs to be updated. Unreachable herein means that the UE is unreachable in the 5G communications system.

S15a: The UE registers with an EPC.

The UE is subsequently attached to the EPC. In a V2X procedure, an MME needs to obtain the parameter of the UE from the HSS. Therefore, the UDM+HSS/UDR learns that the UE registers with a 4G communications network. A message that the MME obtains the parameter from the HSS may be an update location request message.

S16a: The UDM+HSS provides a latest V2X parameter.

In this case, the UDM+HSS/UDR sends a message to the V2XCF, to notify the V2XCF that the parameter of the UE needs to be updated. Subsequently, the V2XCF triggers a parameter update procedure. Details may be as follows.

After receiving the message, the V2XCF finds, by using the message or indication information that indicates that the parameter needs to be updated and that is included in the message, that the V2X parameter stored by the UE needs to be updated.

S17a: The V2XCF provides the V2X parameter for the UE.

The step in which the V2XCF provides the parameter for the UE may be as follows: the V2XCF sends the latest parameter to the UE in a device trigger process. Alternatively, the V2XCF triggers, in a device trigger process, the UE to establish a PDN connection, so as to communicate with the V2XCF.

It can be learned from the descriptions of the foregoing examples that this embodiment of this application provides a method for providing the V2X parameter for the UE through the core network in the 5G communications system. The UDM+HSS determines whether the parameter of the UE needs to be updated, and when the UE accesses the EPC, the UDM+HSS/UDR notifies the V2XCF that the parameter of the UE needs to be updated. According to the foregoing embodiment, a problem that the V2X parameter of the UE is inconsistent with a V2X parameter in the core network is resolved.

Figure 8:
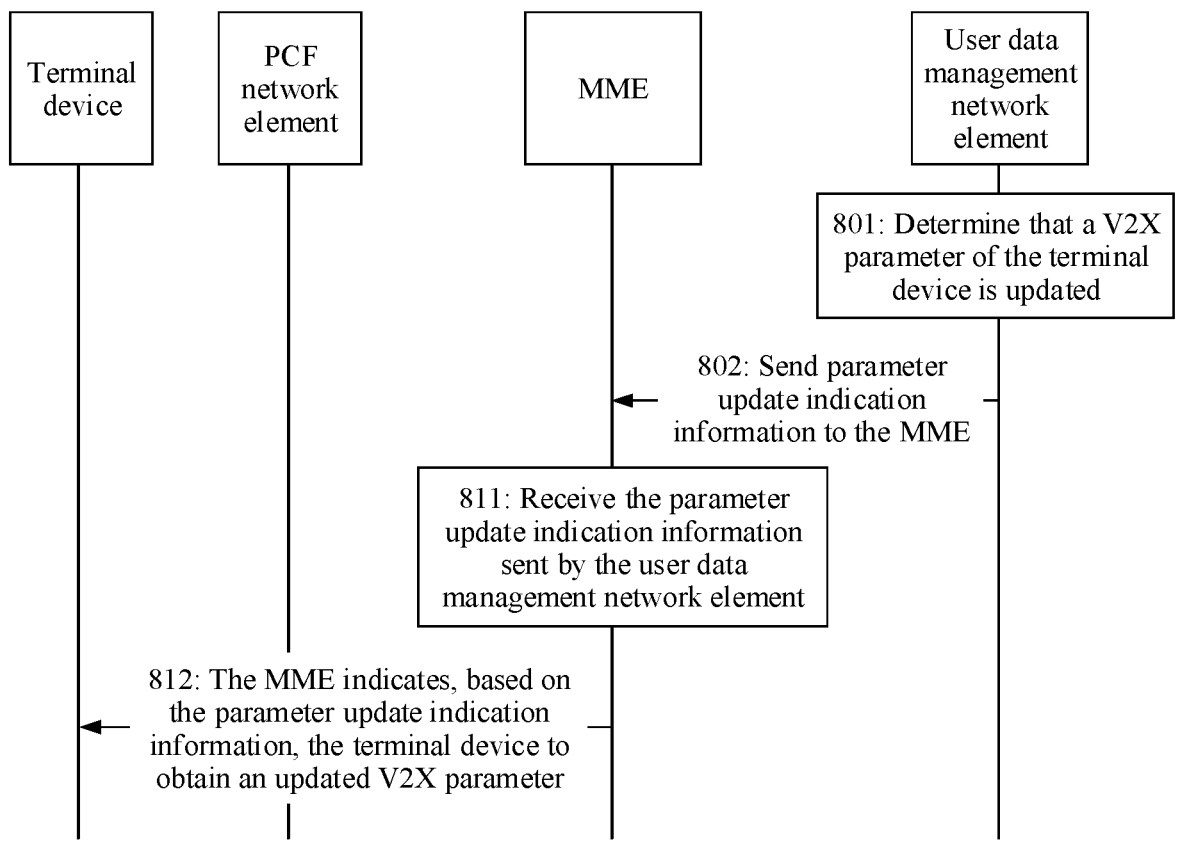
FIG. 8 is another schematic flowchart of interaction between a user data management network element and an MME according to an embodiment of this application.

Based on the foregoing system architecture, the following describes a communication method provided in an embodiment of this application. FIG. 8 is a schematic flowchart of interaction between a user data management network element and a mobility management entity (MME) according to an embodiment of this application. The communication method provided in this embodiment of this application mainly includes the following steps.

801: The user data management network element determines that a V2X parameter of a terminal device is updated.

In this embodiment of this application, the user data management network element is a network element having a data management function in a V2X scenario. For example, the user data management network element may be a UDM and an HSS, or the user data management network element may be a UDR. The user data management network element first updates the V2X parameter of the terminal device. In this embodiment of this application, the user data management network element may store the V2X parameter of the terminal device. When the V2X parameter of the terminal device is updated, the user data management network element may update the V2X parameter of the terminal device. There are a plurality of manners in which the V2X parameter needs to be updated. The following uses an example for description.

In some embodiments of this application, step 801 in which the user data management network element determines that the V2X parameter of the terminal device is updated includes at least one of the following cases:

when determining that the terminal device is in an unreachable state, the user data management network element determines that the V2X parameter is updated;

when determining that the terminal device is in a deregistered state, the user data management network element determines that the V2X parameter is updated; and when determining that the V2X parameter stored by the user data management network element changes, the user data management network element determines that the V2X parameter is updated.

When the terminal device is in the unreachable state, the user data management network element determines that the V2X parameter of the terminal device needs to be updated.

For another example, when the terminal device is in the deregistered state, the user data management network element determines that the V2X parameter of the terminal device needs to be updated. For another example, when the V2X parameter stored by the user data management network element changes, for example, subscription data of a user changes. For example, previous subscription information of the user includes a value-added service, includes a plurality of public land mobile networks, and may support a relatively high maximum transmission rate on a PC5 interface. However, the user cancels the value-added service due to some reasons, and consequently the maximum transmission rate on the PC5 interface decreases. For another example, previous subscription information of a user supports communication through PC5 in a plurality of public land mobile networks. However, because the subscription information changes, supported operators change, or the V2X parameter has expired. Based on the foregoing examples, the user data management network element may accurately learn that the V2X parameter is updated.

In some other embodiments of this application, step 801 in which the user data management network element determines that the vehicle-to-everything V2X parameter of the terminal device is updated includes:

the user data management network element receives parameter delivery request information sent by a policy control function PCF network element, where the parameter delivery request information is used to request the V2X parameter from the user data management network element;

the user data management network element determines a first moment based on the parameter delivery request information;

the user data management network element updates the V2X parameter, and obtains a second moment at which the V2X parameter is updated; and the user data management network element determines, based on the first moment and the second moment, that the V2X parameter is updated.

The user data management network element may determine the first moment based on the parameter delivery request information sent by the PCF network element, where the first moment may be a moment at which the V2X parameter is requested and that is carried in the parameter delivery request information, or may be a moment recorded according to an indication of the parameter delivery request information. The user data management network element may further use a moment at which the V2X parameter is updated as the second moment. The user data management network element compares the obtained first moment and the obtained second moment, and determines, based on the first moment and the second moment, that the V2X parameter needs to be updated. For example, when the first moment and the second moment meet a preset condition, the user data management network element determines that the V2X parameter needs to be updated. For example, when the first moment is different from the second moment, the user data management network element determines that the V2X parameter needs to be updated.

In some embodiments of this application, an embodiment of this application further provides a communication method performed by a PCF network element. The communication method mainly includes the following steps.

The PCF network element sends parameter delivery request information to a user data management network element, where the parameter delivery request information is used to request a V2X parameter of a terminal device from the user data management network element.

The PCF network element receives the V2X parameter sent by the user data management network element.

When the PCF network element needs to provide the V2X parameter for the terminal device, the PCF network element triggers a procedure of obtaining the V2X parameter from the user data management network element. Specifically, the PCF network element requests the V2X parameter from the user data management network element, and the user data management network element sends a response message to the PCF network element, where the message includes the V2X parameter.

In some embodiments of this application, the parameter delivery request information carries a moment at which the PCF network element requests the V2X parameter.

Alternatively, the parameter delivery request information is used to request the user data management network element to obtain a moment at which the parameter delivery request information is received.

Specifically, the user data management network element may determine a first moment based on the parameter delivery request information sent by the PCF network element, where the first moment may be the moment at which the V2X parameter is requested and that is carried in the parameter delivery request information, or may be the moment at which the parameter delivery request information is received and that is recorded according to the indication of the parameter delivery request information. The user data management network element may determine, based on the first moment determined from the parameter delivery request information and a second moment at which the user data management network element updates the V2X parameter, whether the V2X parameter is updated.

802: The user data management network element sends parameter update indication information to the MME, where the parameter update indication information is used to indicate that the V2X parameter of the terminal device is updated.

In this embodiment of this application, after the user data management network element updates the V2X parameter, the user data management network element may send the parameter update indication information to the MME. The parameter update indication information sent by the user data management network element is used to indicate that the V2X parameter of the terminal device is updated.

811: The MME receives the parameter update indication information sent by the user data management network element, where the parameter update indication information is used to indicate that the V2X parameter of the terminal device is updated.

In this embodiment of this application, when the user data management network element performs step 802, the MME receives the parameter update indication information sent by the user data management network element, and the MME that receives the parameter update indication information may determine that the V2X parameter of the terminal device is updated. For example, the user data management network element may be an HHS.

In some embodiments of this application, the parameter update indication information is sent by the user data management network element to the MME in response to a fact that the terminal device is in an unreachable state or a deregistered state, or the V2X parameter stored by the user data management network element changes.

When the terminal device is in the unreachable state, the user data management network element determines that the V2X parameter of the terminal device needs to be updated. For another example, when the terminal device is in the deregistered state, the user data management network element determines that the V2X parameter of the terminal device needs to be updated. For another example, when the V2X parameter stored by the user data management network element changes, for example, subscription data of a user changes. For example, previous subscription information of the user includes a value-added service, includes a plurality of public land mobile networks, and may support a relatively high maximum transmission rate on a PC5 interface. However, the user cancels the value-added service due to some reasons, and consequently the maximum transmission rate on the PC5 interface decreases. For another example, previous subscription information of a user supports communication through PC5 in a plurality of public land mobile networks. However, because the subscription information changes, supported operators change, or the V2X parameter has expired.

812: The MME indicates, based on the parameter update indication information, the terminal device to obtain an updated V2X parameter.

In this embodiment of this application, after the MME receives the parameter update indication information, the MME determines, according to the parameter update indication information, that the V2X parameter is updated, and the MME may send the updated V2X parameter to the terminal device. Therefore, the terminal device may obtain the updated V2X parameter in a timely manner, and the terminal device may perform communication by using the updated V2X parameter, to resolve a problem that communication fails because the terminal device uses an expired V2X parameter.

In this embodiment of this application, the MME indicates, in a plurality of implementations, the terminal device to obtain the updated V2X parameter. For example, the MME may obtain the updated V2X parameter, and then send the updated V2X parameter to the terminal device. In other words, the MME may directly send the updated V2X parameter to the terminal device. Alternatively, the MME may send indication information to indicate the terminal device to communicate with the V2X control network element. For example, the MME may send only the indication information to the terminal device, to indicate the terminal device to obtain the updated V2X parameter from the V2X control network element through a PDN connection.

In some embodiments of this application, before the MME sends the updated V2X parameter to the terminal device, the communication method provided in this embodiment of this application may further include the following steps.

The MME obtains the updated V2X parameter from the user data management network element.

The user data management network element may update the V2X parameter, and store the updated V2X parameter. The user data management network element may interact with the MME, to provide the updated V2X parameter for the MME.

It can be learned from the descriptions of the foregoing embodiment that the MME receives the parameter update indication information sent by the user data management network element, where the parameter update indication information is used to indicate that the V2X parameter of the terminal device is updated. The MME sends the updated V2X parameter to the terminal device based on the parameter update indication information. In this embodiment of this application, the MME may receive the parameter update indication information from the user data management network element, and the MME may send the updated V2X parameter to the terminal device based on the received indication information. Therefore, the terminal device may obtain the updated V2X parameter from the MME, and the terminal device may perform communication by using the updated V2X parameter, to resolve a problem that communication fails because the terminal device uses an expired V2X parameter.

To better understand and implement the foregoing solutions in the embodiments of this application, the following uses a corresponding application scenario as an example for specific description.

Figure 9:
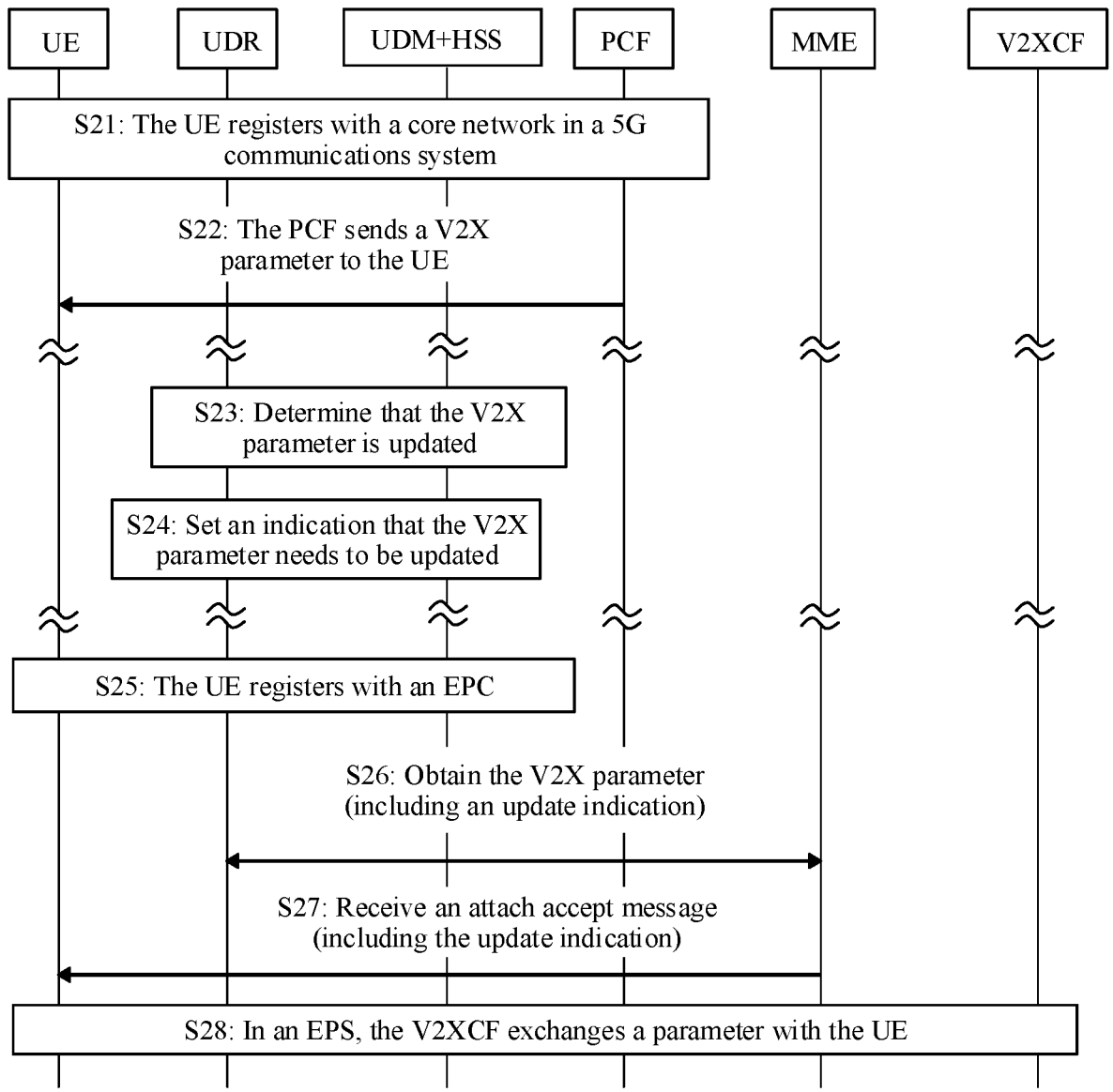
FIG. 9 is a schematic interaction flowchart of a communication method in another interaction scenario according to an embodiment of this application.

FIG. 9 is a schematic interaction flowchart of a communication method in an interaction scenario according to an embodiment of this application. Descriptions are provided by using an example in which a V2X control network element is specifically a V2XCF, a terminal device is specifically UE, and a user data management network element is specifically a UDM+HSS or a UDR. The communication method mainly includes the following procedure.

S21: The UE registers with a core network in a 5G communications system.

The UE may register with the core network in the 5G system. A specific registration procedure is not described.

S22: A PCF sends a V2X parameter to the UE.

When the PCF needs to provide the V2X parameter for the UE, the PCF triggers a procedure of obtaining the V2X parameter from the UDM+HSS/UDR. Specifically, the PCF requests the V2X parameter from the UDM+HSS or the UDR, and the UDM+HSS/UDR sends a response message to the PCF, where the message includes the V2X parameter.

S23: The UDM+HSS/UDR determines that the V2X parameter is updated.

If the V2X parameter of the UE changes, for example, subscription information of the UE changes, the information may be subscription information stored in the UDM+HSS/UDR.

S24: The UDM+HSS/UDR sets an indication that the V2X parameter needs to be updated.

That the UDM+HSS/UDR records the information that "the parameter needs to be updated on the UE side" may be specifically as follows: the UDM+HSS/UDR records information about a moment at which the UDM+HSS/UDR updates the parameter of the UE, and determines, by comparing a moment at which the parameter is sent to the UE and the moment at which the parameter of the UE is updated, that the parameter on the UE side needs to be updated. Alternatively, when the parameter of the UE needs to be updated, the UDM+HSS/UDR finds that the UE is unreachable. In this case, the UDM+HSS/UDR determines that the parameter on the UE side needs to be updated.

S25: The UE registers with an EPC.

S26: An MME obtains the V2X parameter (including an update indication).

The UE is subsequently attached to the EPC. In a V2X procedure, the MME needs to obtain the parameter from the HSS. Therefore, the UDM+HSS/UDR learns that the parameter of the UE needs to be updated. The MME obtains the subscription information of the UE in the EPC. In this case, the UDM+HSS/UDR sends a message to the MME, where the message includes indication information, to indicate that the V2X parameter stored by the UE needs to be updated.

S27: The UE receives an attach accept message (including the update indication).

The MME may use a non-access stratum (NAS) message sent to the UE to carry the indication information sent by the UDM+HSS/UDR, where the indication information may be included in the subscription information of the UE.

S28: In an EPS, the V2XCF exchanges a parameter with the UE.

It can be learned from the descriptions of the foregoing examples that this embodiment of this application provides a method for using the subscription information to carry update information of the UE. The MME sends information to the UE by using the NAS message, to notify the UE that a procedure of interaction with the V2XCF needs to be triggered. In this embodiment of this application, the NAS message is used to carry the V2X parameter. Therefore, implementation is relatively simple, and the V2XCF does not need to trigger a device trigger process or the like. According to the foregoing embodiment, a problem that the V2X parameter of the UE is inconsistent with a V2X parameter in the core network is resolved.

It should be noted that for ease of brief description, the foregoing method embodiments are represented as a series of actions. However, a person skilled in the art should appreciate that this application is not limited to the described order of the actions, because according to this application, some steps may be performed in other orders or simultaneously. In addition, a person skilled in the art should also appreciate that the embodiments described in this specification are all embodiments, and the actions and modules are not necessarily mandatory in this application.

To better implement the foregoing solutions in the embodiments of this application, the following further provides a related apparatus for implementing the foregoing solutions.

An embodiment of this application provides a communications apparatus. The communications apparatus is a vehicle-to-everything V2X control network element and includes at least one processor, and the at least one processor is configured to: be coupled to a memory, and read and execute instructions in the memory, to implement the communication method performed by the foregoing V2X control network element.

In a possible implementation, the communications apparatus further includes the memory.

An embodiment of this application provides another communications apparatus. The communications apparatus is a user data management network element and includes at least one processor, and the at least one processor is configured to: be coupled to a memory, and read and execute instructions in the memory, to implement the communication method performed by the foregoing user data management network element.

In a possible implementation, the communications apparatus further includes the memory.

An embodiment of this application provides another communications apparatus. The communications apparatus is a policy control function PCF network element and includes at least one processor, and the at least one processor is configured to: be coupled to a memory, and read and execute instructions in the memory, to implement the communication method performed by the foregoing PCF network element.

In a possible implementation, the communications apparatus further includes the memory.

It should be noted that content such as information exchange between the modules/units of the apparatus and the execution processes thereof is based on a same concept as the method embodiments of this application, and achieves same technical effects as the method embodiments of this application. For specific content, refer to the foregoing descriptions in the method embodiments of this application. Details are not described herein again.

An embodiment of this application further provides a computer storage medium. The computer storage medium stores a program. The program is executed to perform some or all of the steps recorded in the method embodiments.

Figure 10:
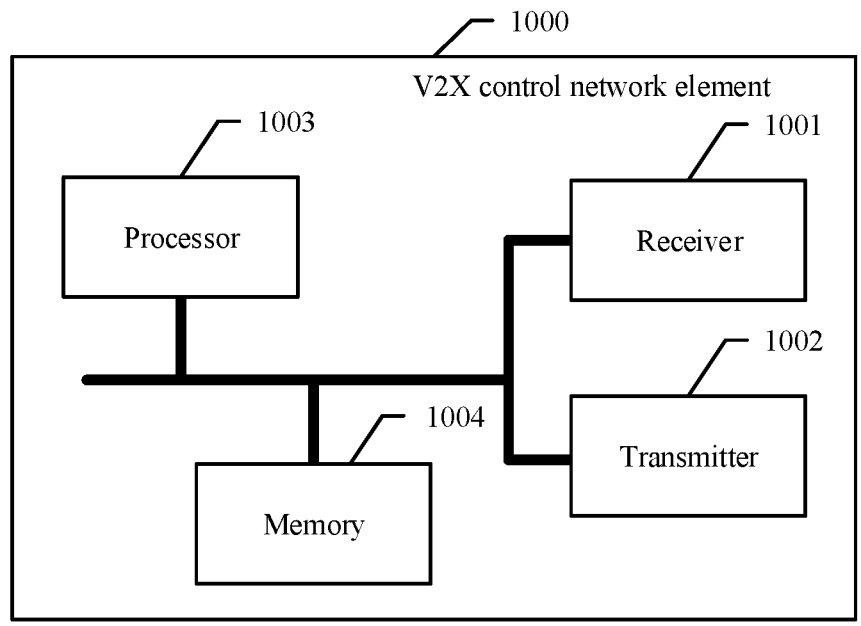
FIG. 10 is a schematic diagram of a composition structure of a V2X control network element according to an embodiment of this application.

The following describes a V2X control network element provided in an embodiment of this application. Refer to FIG. 10. The V2X control network element 1000 includes a processor 1003. Optionally, the V2X control network element 1000 further includes a memory 1004. Optionally, the V2X control network element 1000 further includes a receiver 1001 and a transmitter 1002. There may be one or more processors 1003 in the V2X control network element 1000. One processor is used as an example in FIG. 10. In some embodiments of this application, the receiver 1001, the transmitter 1002, the processor 1003, and the memory 1004 may be connected through a bus or in another manner. In FIG. 10, for example, the receiver 1001, the transmitter 1002, the processor 1003, and the memory 1004 are connected through the bus.

The memory 1004 may include a read-only memory and a random access memory, and provide instructions and data for the processor 1003. A part of the memory 1004 may further include a non-volatile random access memory (NVRAM). The memory 1004 stores an operating system and an operation instruction, an executable module or a data structure, a subset thereof, or an extended set thereof. The operation instruction may include various operation instructions to implement various operations. The operating system may include various system programs, to implement various basic services and process hardware-based tasks.

The processor 1003 controls operations of the V2X control network element 1000, and the processor 1003 may also be referred to as a central processing unit (CPU). In specific application, all components of the V2X control network element 1000 are coupled together by using a bus system. In addition to a data bus, the bus system may further include a power bus, a control bus, a status signal bus, and the like. However, for clear description, various buses in the figure are referred to as the bus system.

The methods disclosed in the foregoing embodiments of this application may be applied to the processor 1003, or may be implemented by the processor 1003. The processor 1003 may be an integrated circuit chip and has a signal processing capability. In an implementation process, the steps in the foregoing methods may be completed by using a hardware integrated logic circuit in the processor 1003 or instructions in a form of software. The processor 1003 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. The steps in the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1004, and the processor 1003 reads information in the memory 1004 and completes the steps in the foregoing methods in combination with hardware of the processor 1003.

The receiver 1001 may be configured to: receive entered digital or character information, and generate signal input related to a related setting and function control of the V2X control network element 1000. The transmitter 1002 may include a display device such as a display, and the transmitter 1002 may be configured to output digital or character information through an external interface.

In this embodiment of this application, the processor 1003 is configured to perform the communication method performed by the V2X control network element.

Figure 11:
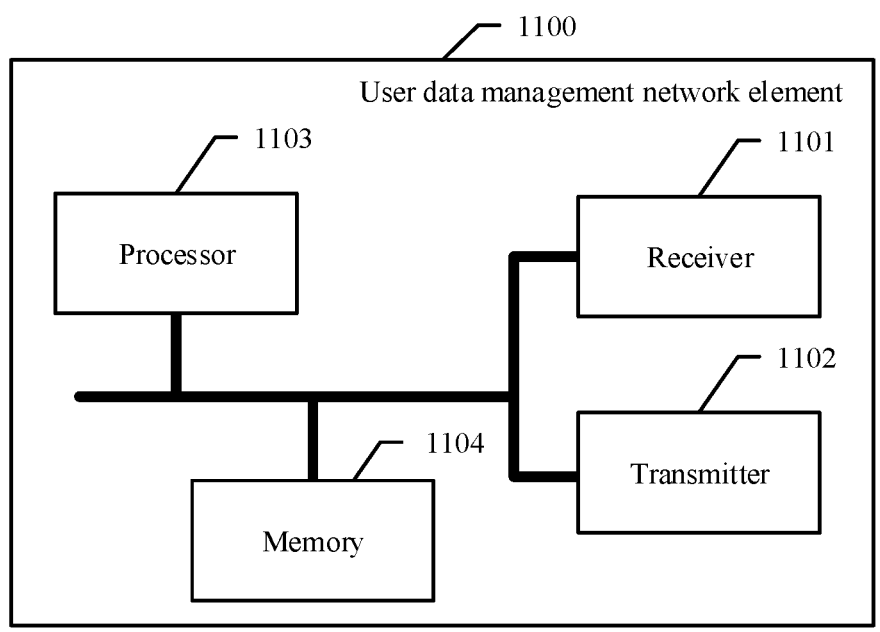
FIG. 11 is a schematic diagram of a composition structure of a user data management network element according to an embodiment of this application.

The following describes another user data management network element provided in an embodiment of this application. Refer to FIG. 11. The user data management network element 1100 includes a processor 1103. Optionally, the user data management network element 1100 further includes a memory 1104. Optionally, the user data management network element 1100 further includes a receiver 1101 and a transmitter 1102. There may be one or more processors 1103 in the user data management network element 1100. One processor is used as an example in FIG. 11. In some embodiments of this application, the receiver 1101, the transmitter 1102, the processor 1103, and the memory 1104 may be connected through a bus or in another manner. In FIG. 11, for example, the receiver 1101, the transmitter 1102, the processor 1103, and the memory 1104 are connected through the bus.

The memory 1104 may include a read-only memory and a random access memory, and provide instructions and data for the processor 1103. A part of the memory 1104 may further include an NVRAM. The memory 1104 stores an operating system and an operation instruction, an executable module or a data structure, a subset thereof, or an extended set thereof. The operation instruction may include various operation instructions to implement various operations. The operating system may include various system programs, to implement various basic services and process hardware-based tasks.

The processor 1103 controls operations of the user data management network element, and the processor 1103 may also be referred to as a CPU. In specific application, all components of the user data management network element are coupled together by using a bus system. In addition to a data bus, the bus system may further include a power bus, a control bus, a status signal bus, and the like. However, for clear description, various buses in the figure are referred to as the bus system.

The methods disclosed in the foregoing embodiments of this application may be applied to the processor 1103 or implemented by the processor 1103. The processor 1103 may be an integrated circuit chip and has a signal processing capability. In an implementation process, the steps in the foregoing methods may be completed by using a hardware integrated logic circuit in the processor 1103 or instructions in a form of software. The processor 1103 may be a general-purpose processor, a DSP, an ASIC, an FPGA or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. The steps in the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1104, and the processor 1103 reads information in the memory 1104 and completes the steps in the foregoing methods in combination with hardware of the processor 1103.

In this embodiment of this application, the processor 1103 is configured to perform the communication method performed by the user data management network element.

Figure 12:
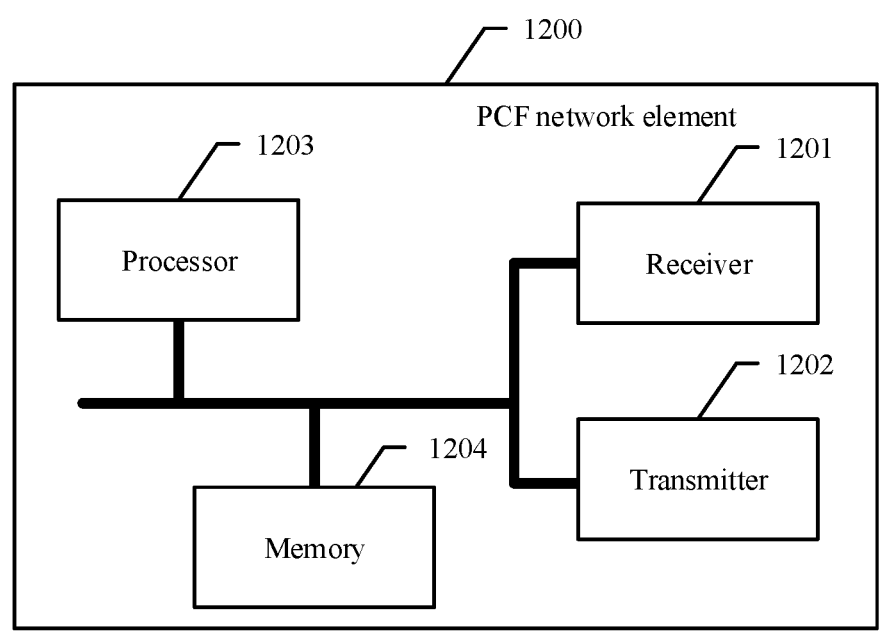
FIG. 12 is a schematic diagram of a composition structure a PCF network element according to an embodiment of this application.

The following describes another PCF network element provided in an embodiment of this application. Refer to FIG. 12, the PCF network element 1200 includes a processor 1203. Optionally, the PCF network element 1200 further includes a memory 1204. Optionally, the PCF network element 1200 further includes a receiver 1201 and a transmitter 1202. There may be one or more processors 1203 in the PCF network element 1200. One processor is used as an example in FIG. 12. In some embodiments of this application, the receiver 1201, the transmitter 1202, the processor 1203, and the memory 1204 may be connected through a bus or in another manner. In FIG. 12, for example, the receiver 1201, the transmitter 1202, the processor 1203, and the memory 1204 are connected through the bus.

The memory 1204 may include a read-only memory and a random access memory, and provide instructions and data for the processor 1203. A part of the memory 1204 may further include an NVRAM. The memory 1204 stores an operating system and an operation instruction, an executable module or a data structure, a subset thereof, or an extended set thereof. The operation instruction may include various operation instructions to implement various operations. The operating system may include various system programs, to implement various basic services and process hardware-based tasks.

The processor 1203 controls operations of the PCF network element. The processor 1203 may also be referred to as a CPU. In specific application, all components of the PCF network element are coupled together by using a bus system. In addition to a data bus, the bus system may further include a power bus, a control bus, a status signal bus, and the like. However, for clear description, various buses in the figure are referred to as the bus system.

The methods disclosed in the embodiments of this application may be applied to the processor 1203 or implemented by the processor 1203. The processor 1203 may be an integrated circuit chip and has a signal processing capability. In an implementation process, the steps in the foregoing methods may be completed by using a hardware integrated logic circuit in the processor 1203 or instructions in a form of software. The processor 1203 may be a general-purpose processor, a DSP, an ASIC, an FPGA or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. The steps in the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1204, and the processor 1203 reads information in the memory 1204 and completes the steps in the foregoing methods in combination with hardware of the processor 1203.

In this embodiment of this application, the processor 1203 is configured to perform the communication method performed by the PCF network element.

In another possible design, when the V2X control network element, the user data management network element, and the PCF network element each are a chip in a server, the chip includes a processing unit and a communications unit. The processing unit may be, for example, a processor, and the communications unit may be, for example, an input/output interface, a pin, or a circuit. The processing unit may execute computer-executable instructions stored in a storage unit, so that the chip in the terminal performs the communication method according to any one of the possible implementations of the first aspect. Optionally, the storage unit is a storage unit in the chip, such as a register or a buffer; or the storage unit may be a storage unit in the terminal but outside the chip, such as a read-only memory (ROM), another type of static storage device that can store static information and instructions, or a random access memory (RAM).

The processor mentioned above may be a general-purpose central processing unit, a microprocessor, an ASIC, or one or more integrated circuits for controlling program execution of the method according to the first aspect.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all of the modules may be selected based on an actual requirement to achieve the objectives of the solutions of the embodiments. In addition, in the accompanying drawings of the apparatus embodiments provided in this application, connection relationships between modules indicate that the modules have communication connections to each other, which may be specifically implemented as one or more communications buses or signal cables.

Based on the descriptions of the foregoing implementations, a person skilled in the art may clearly understand that this application may be implemented by software in addition to necessary universal hardware, or certainly may be implemented by dedicated hardware, including a dedicated integrated circuit, a dedicated CPU, a dedicated memory, a dedicated component, and the like. Usually, all functions completed by a computer program may be easily implemented by using corresponding hardware, and a specific hardware structure used to implement a same function may also be of various forms, for example, a form of an analog circuit, a digital circuit, or a dedicated circuit. However, in this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communication method comprising:
   receiving, by a vehicle-to-everything (V2X) control network element, parameter update indication information from a user data management network element,
      wherein the parameter update indication information indicates that a V2X parameter of a terminal device is updated; and
   sending, by the V2X control network element, an updated V2X parameter to the terminal device based on the parameter update indication information,
      wherein the updated V2X parameter is obtained from the user data management network element.

2. The method according to claim 1, wherein the parameter update indication information indicates that the terminal device is reachable in a first network, and the V2X control network element is a network element in the first network.

3. The method according to claim 2, wherein the terminal device is registered with the first network.

4. The method according to claim 1, wherein the V2X parameter comprises at least one of the following:
   a public land mobile network (PLMN) list used for communication through a PC5 interface;
   indication information indicating whether to perform communication through the PC5 interface;
   a radio resource configuration parameter used for communication through the PC5 interface; or
   network selection policy information used for communication through the PC5 interface.

5. The method according to claim 1, wherein the V2X parameter comprises a mapping relationship between a V2X service and identification information of the terminal device.

6. A communication method comprising:
  determining, by a user data management network element, that a vehicle-to-everything (V2X) parameter of a terminal device is updated;
  sending, by the user data management network element, parameter update indication information to a V2X control network element,
    wherein the parameter update indication information is used to indicate that the V2X parameter of the terminal device is updated; and
  sending, by the user data management network element, the updated V2X parameter to the V2X control network element.

7. The method according to claim 6, wherein determining, by the user data management network element, that the V2X parameter of the terminal device is updated comprises:
  receiving, by the user data management network element, parameter delivery request information from a policy control function (PCF) network element,
    wherein the parameter delivery request information is used to request the V2X parameter of the terminal device from the user data management network element;
  determining, by the user data management network element, a first moment based on the parameter delivery request information;
  updating, by the user data management network element, the V2X parameter of the terminal device, and obtaining a second moment at which the V2X parameter is updated; and
  determining, by the user data management network element based on the first moment and the second moment, that the V2X parameter of the terminal device is updated.

8. The method according to claim 7, wherein the first moment is a request moment carried in the parameter delivery request information.

9. The method according to claim 7, wherein the first moment is a moment at which the parameter delivery request information is received.

10. The method according to claim 6, wherein determining the V2X parameter of the terminal device is updated comprises at least one of the following cases:
  in response to determining that the terminal device is in an unreachable state, determining, by the user data management network element, that the V2X parameter is updated; or
  in response to determining that the terminal device is in a deregistered state, determining, by the user data management network element, that the V2X parameter is updated.

11. The method according to claim 6, wherein the V2X parameter comprises at least one of the following:
  a public land mobile network (PLMN) list used for communication through a PC5 interface;
  indication information indicating whether to perform communication through the PC5 interface;
  a radio resource configuration parameter used for communication through the PC5 interface; or
  network selection policy information used for communication through the PC5 interface.

12. The method according to claim 6, wherein the V2X parameter comprises a mapping relationship between a V2X service and identification information of the terminal device.

13. The method according to claim 6, wherein determining the V2X parameter of the terminal device is updated comprises determining, by the user data management network element, a change of the V2X parameter stored by the user data management network element.

14. The method according to claim 6, wherein the parameter update indication information indicates that the terminal device is reachable in a first network, and the V2X control network element is a network element in the first network.

15. The method according to claim 14, wherein the terminal device is registered with the first network.

16. A vehicle-to-everything (V2X) control network element comprising:
  at least one processor, coupled to a memory, wherein the at least one processor is configured to read and execute instructions in the memory, thereby causing the V2X control network element to:
    receive parameter update indication information from a user data management network element,
      wherein the parameter update indication information indicates that a V2X parameter of a terminal device is updated; and
    send an updated V2X parameter to the terminal device based on the parameter update indication information,
      wherein the updated V2X parameter is obtained from the user data management network element.

17. The V2X control network element according to claim 16, wherein the parameter update indication information indicates that the terminal device is reachable in a first network, and the V2X control network element is a network element in the first network.

18. The V2X control network element according to claim 17, wherein that the terminal device is reachable in the first network comprises the terminal device is registered with the first network.

19. The V2X control network element according to claim 16, wherein the V2X parameter comprises at least one of the following:
  a public land mobile network (PLMN) list used for communication through a PC5 interface;
  indication information indicating whether to perform communication through the PC5 interface;
  a radio resource configuration parameter used for communication through the PC5 interface; or
  network selection policy information used for communication through the PC5 interface.

20. The V2X control network element according to claim 16, wherein the V2X parameter comprises a mapping relationship between a V2X service and identification information of the terminal device.

* * * * *